United States Patent
Nakajo

(10) Patent No.: US 7,529,169 B2
(45) Date of Patent: May 5, 2009

(54) OPTICAL DISC DEVICE

(75) Inventor: Yukihisa Nakajo, Yokohama (JP)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 715 days.

(21) Appl. No.: 11/272,834

(22) Filed: Nov. 15, 2005

(65) Prior Publication Data

US 2006/0109767 A1    May 25, 2006

(30) Foreign Application Priority Data

Nov. 15, 2004 (JP) ............... 2004-330991
Jul. 28, 2005 (JP) ............... 2005-219487

(51) Int. Cl.
*G11B 20/10* (2006.01)
(52) U.S. Cl. ............... 369/59.12; 369/47.51
(58) Field of Classification Search ............... None
See application file for complete search history.

(56) References Cited

U.S. PATENT DOCUMENTS 7,352,659 B2 * 4/2008 Verschuren ............ 369/13.08

FOREIGN PATENT DOCUMENTS

| JP | 2000-030254 | 1/2000 |
|---|---|---|
| JP | 2003-030837 | 1/2003 |
| KR | 1020010056435 A | 7/2001 |

* cited by examiner

*Primary Examiner*—Paul Huber
(74) *Attorney, Agent, or Firm*—Volentine & Whitt, PLLC.

(57) ABSTRACT

An optical disc device includes means for recording and reproducing information using a reference write strategy or an alternative write strategy in which pulse widths of 3T, 4T and 5-14T marks are individually varied, when the information is recorded using 1T strategy. The device also includes means for measuring a length of each of the marks, and memory for storing the measured length of each of the marks and a theoretical length of each of the marks. The device further includes means for computing inherent contractile rates of the marks; and means for computing a variation rate of the inherent contractile rate of each of the marks when pulse widths of 3T, 4T and 5-14T marks are individually varied and obtaining a variance of each of the marks. The optical disc device sets the write strategy such that the variance is minimized.

8 Claims, 16 Drawing Sheets

Fig. 17A

|     | Ref    | eTdlp1 | oTdlp1 | e-odlp1 |
|-----|--------|--------|--------|---------|
| 3T  | -2.368 | -4.415 | -3.574 | -5.309  |
| 4T  | -0.664 | -3.596 | -1.863 | +2.861  |
| 5T  | +3.077 | +1.72  | +6.308 | +4.414  |
| 6T  | +1.531 | +1.885 | +0.908 | +0.847  |
| 7T  | -4.477 | +3.405 | +6.347 | +4.457  |
| 8T  | +4.262 | +4.453 | +3.928 | +3.344  |
| 9T  | +5.184 | +4.263 | +7.723 | +5.768  |
| 10T | +3.949 | -4.207 | +3.914 | +3.17   |
| 11T | +5.599 | -5.698 | +6.433 | -6.141  |
| 14T | +4.362 | +4.645 | +6.473 | +3.895  |

Fig. 17B

|     | eTdlp1  | oTdlp1  | e-odlp1 |
|-----|---------|---------|---------|
| 3T  | -1.0235 | -0.603  | -1.4705 |
| 4T  | +2.13   | -0.5995 | +1.7625 |
| 5T  | -0.6785 | +1.6155 | +0.6695 |
| 6T  | +0.177  | -0.3115 | -0.342  |
| 7T  | -0.536  | +0.935  | -0.01   |
| 8T  | +0.0955 | -0.167  | -0.459  |
| 9T  | -0.4605 | +0.2695 | +0.287  |
| 10T | +0.129  | -0.0175 | -0.3895 |
| 11T | +0.0495 | +0.417  | -0.4075 |
| 14T | +0.1415 | +1.0555 | -0.2335 |

Fig. 17C

|      | eTdlp1  | oTdlp1  | e-odlp1 |
|------|---------|---------|---------|
| 3T   |         |         | Δ3T     |
| 4T   | e(4T)   |         | Δ4T     |
| 5T   |         | o(5T)   | Δ5T     |
| 6T   | e(6T)   |         | Δ6T     |
| 7T   |         | o(7T)   | Δ7T     |
| 8T   | e(8T)   |         | Δ8T     |
| 9T   |         | o(9T)   | Δ9T     |
| 10T  | e(10T)  |         | Δ10T    |
| 11T  |         | o(11T)  | Δ11T    |
| 14T  | e(14T)  |         | Δ14T    |

Fig. 18A

|      | eTdlp1    | oTdlp1   |
|------|-----------|----------|
| 3T   | −0.9039   | −0.5165  |
| 4T   | +2.13     | −0.5165  |
| 5T   | −0.9039   | +1.6155  |
| 6T   | +0.177    | −0.5165  |
| 7T   | −0.9039   | +1.00394 |
| 8T   | +0.10523  | −0.5165  |
| 9T   | −0.9039   | +1.00394 |
| 10T  | +0.10523  | −0.5165  |
| 11T  | −0.9039   | +1.00394 |
| 14T  | +0.10523  | −0.5165  |

Fig. 18B

|      | eTdlp1    | oTdlp1   |
|------|-----------|----------|
| 3T   | −0.964    | −0.5229  |
| 4T   | +2.28244  | −0.5229  |
| 5T   | −0.964    | +1.62691 |
| 6T   | +0.17794  | −0.5229  |
| 7T   | −0.964    | +1.03045 |
| 8T   | +0.08831  | −0.5229  |
| 9T   | −0.964    | +1.03045 |
| 10T  | +0.08831  | −0.5229  |
| 11T  | −0.964    | +1.03045 |
| 14T  | +0.08831  | −0.5229  |

OPTICAL DISC DEVICE

BACKGROUND OF THE INVENTION

1. Field of the Invention

The present invention relates to an optical disc device that can record information in an optical disc and reproduce recorded information from the optical disc, and a method for recording optical information.

This application claims the priority of Japanese Patent Application No. 2004-330991, filed on Nov. 15, 2004, and Japanese Patent Application No. 2005-219487, filed on Jul. 28, 2005, in the Japanese Patent Office, the disclosure of which are incorporated herein in its entirety by reference.

2. Description of the Related Art

A variety of writable optical recording mediums are commercially available which allow users to record large amounts of information. Examples include write once read memory (WORM) type optical discs, such as CD-R discs, and rewritable type optical discs, such as CD-RW discs. More recently, high-capacity digital video discs (e.g., DVD-R, DVD-RW and DVD-RAM) have been introduced as the result of the use of shorter wavelength laser beams, decreased spot diameters, and thin substrates. Generally, data is recorded in the form of non-reflective marks along a spiral track of the optical discs. Herein, the term "mark" refers to the pit, spot or region along the track in which data of a given logic value (e.g., "1") is recorded along the track. For example, the marks may be formed as non-translucent dye regions in the case of CD-R discs, or as amorphous regions in the case of CD-RW discs. The spaces located between the marks along the spiral track are often referred to as "lands". The lands are typically formed as translucent dye regions in the case of CD-R discs, and as polycrystalline regions in the case of CD-RW discs.

In order to avoid extended gaps (which can cause tracking problems) where there are no marks in the data track of a compact disc, data is typically encoded using "Eight to Fourteen Modulation" (EFM). In EFM, 8-bit bytes are converted to 14 bits, with at least some of the 14 bits being logic "1" (marks). However, variations in physical characteristics among optical discs can result in improper recording of the EFM signal. That is, mark formation failures can occur for a variety of reasons, such as variations in the composition of the dye recording layer of the optical disc, and heat accumulation of the recording media coupled with an insufficient cooling rate. In other words, the writer parameters that might be best suited for one optical disc may not be ideal for another optical disc.

As such, in an effort to improve write accuracy, a reference write pattern is used to determine and set optimal or preferred write parameters of an optical disc to be recorded in advance of a recording operation. Herein, the set write parameters associated with an optical disc are referred to as a "write strategy" of the optical disc. It is known that this write strategy is closely related with a number of factors, including recording rate, dye material, phase-change material, dye film thickness, track configuration, and so on.

The write strategy generally defines or sets a number of variable write conditions of the optical disc. For example, the mark-to-land ratio may be varied, an additional pulse may be added to the front end of a write pulse, the rise or fall position of a write pulse may be altered, a write pulse may be converted to a multi-pulse format, and so on.

A mark is generated by irradiating a short pulse onto the optical disc at a high recording power. By varying the mark-to-land ratio it is possible to provide a good shape for the front end and rear end of the mark, by shortening the length of the mark during a low speed recording.

Adding an additional pulse to the front end of a recording pulse enhances the shape of the front end, which is formed by additively applying a recording power to the front end of the mark that is hard to deform by heat due to irradiation of the laser.

Changing the rise or fall position of a recording pulse by a combination of the mark and land can make uniform the length of the mark and land. When the mark and land are formed, the position of the front end of the land is adjusted according to the distance to the rear end of the land because the heat from creating any mark will also influence a subsequent mark. So the position of any land is changed or the heat for recording the front of the mark is transferred to the land in front of a mark according to the length of the land in front of the mark, and the rear position of the mark is changed or the heat for recording the rear end of the mark is transferred to the land behind the mark to influence the land behind the mark, according to the length of the recording mark.

The method of converting a recording pulse into a multi-pulse format is mainly used for a phase change disc, such as a CD-RW, or a DVD. When recording information in a phase change disc using a successive pulse, heat generated during the recording operation erases the front end of the recorded information. To solve the above erase problem, a multi-pulse having a cooling period between recording pulses is used.

Also, since there exist in the market too many kinds of optical discs so that manufacturers cannot be aware of and account for all of them completely, it is impossible to prepare a proper write strategy in advance for all optical discs in the market.

Due to the above problem, a method of recording information while varying a write strategy into two or more tracks in an optical disc area and selecting a write strategy for which reproduction jitter is minimized (e.g., Japanese Patent Publication No. 2000-30254), and a method of recording information using a specific record pattern, and obtaining a combination of marks and lands by which a jitter value or a deviation value is minimized (e.g., Japanese Patent Publication No. 2003-30837), are proposed.

However, in the method disclosed in Japanese Patent Publication No. 2000-30254, a finally selected write strategy is only the best write strategy among the predetermined set of write strategies, and is not the optimal write strategy for an optical disc in use. In addition, this method is problematic in that tracks are used as a record area necessary for a test.

Also, in the method disclosed in Japanese Patent Publication No. 2003-30837, since a particular pattern is used and an influence on a mark or a space other than when changing the particular mark or space is not sufficiently considered, it is very difficult to set an optimal write strategy for an optical disc in use.

Further, in recording information on a DVD-RW, it is problematic in that a regulation recommends that different writes strategies be used for the case of an even T than for the case of an odd T. Also, it is problematic that too many parameters are used in order to set such write strategies. Further, it is difficult to set such write strategies.

SUMMARY OF THE INVENTION

Exemplary embodiments of the present invention provide an optical disc device and a method for recording optical information that substantially obviate one or more problems due to limitations and disadvantages of the related art.

Exemplary embodiments of the present invention provide an optical disc device, and a method for recording optical information that can set a write strategy optimal for a disc in use and having a high precision within a short time period without using a special recording pattern even in a DVD-RW having a difficult setting condition.

An embodiment of the present invention provides an optical disc device for recording and reproducing information by forming marks and lands in a rewritable DVD disc, comprising: recording means for recording information using a reference write strategy and an alternative write strategy in which pulse widths of 3T, 4T and 5-14T marks are individually varied by a set amount with respect to the reference write strategy, when the information is recorded using a 1T strategy; reproducing means for reproducing the recorded information using each of the reference write strategy and the alternative write strategy; mark length measuring means for measuring a length of each of the marks from the reproduced information; memory for storing the measured length of each of the marks, and also storing a theoretical length of each of the marks; contractile rate computing means for computing inherent contractile rates of the marks from the measured lengths and the theoretical lengths of the marks stored in the memory; variance computing means for computing a variation rate of the inherent contractile rate of each of the marks from the computed inherent contractile rate when pulse widths of 3T, 4T and 5-14T marks are individually varied by a set amount with respect to the reference write strategy, and obtaining a variance of each of the marks based on equation 1:

$$K = \sum_{i=3}^{14} (dev(iT) - Avg)^2 * R(iT), \quad (1)$$

where dev(iT) is a deviation of the iT mark; "Avg" is a mean value of the deviations of all the marks; and where R(iT) is a probability of occurrence of mark (iT) and is a known value; and write strategy setting means for setting the write strategy such that the variance when the pulse widths of the 3T, 4T and 5-14T marks are individually varied is minimized Another embodiment of the present invention provides an optical disc device for recording and reproducing information by forming marks and lands in a rewritable DVD disc, comprising: recording means for recording information using a reference write strategy and an alternative write strategy in which final pulse widths of an even T mark and an odd T mark, an offset of a final pulse, and a pulse width of a 3T mark are individually varied by a set amount with respect to the reference write strategy, when the information is recorded using 2T strategy; reproducing means for reproducing the recorded information using each of the reference write strategy and the alternative write strategy; mark length measuring means for measuring lengths of each of the marks of the 3T mark, the even T marks, and the odd T marks except for the 3T mark, from the reproduced information; memory for storing the measured length of each of the marks and a theoretical length of each of the marks; variation rate computing means for computing inherent contractile rates of the 3T mark, the even T marks, and the odd T marks except for the 3T mark from the stored length of each of the marks and the stored theoretical length of each of the marks, and a variation rate of each of the marks when the final pulse widths, the offset of the final pulse, and the pulse width of the 3T mark are varied; and write strategy setting means for setting the write strategy from the computed variation rate such that the inherent contractile rate of each of the marks is below a set value.

In one embodiment, the variation rate computing means computes the inherent contractile rate of each of the marks based on probability of occurrence of each of the marks and a deviation between a length of each of the marks of when the information is recorded using the reference write strategy and a length of each of the marks when the information is recorded using the alternative write strategy in which the final pulse widths of the even T marks and the odd T marks, the offset of the final pulse, and the pulse width of the 3T mark are individually varied by a set amount with respect to the reference write strategy.

In one embodiment, the above optical disc device further includes: land length measuring means for measuring lengths of lands before and after the 3T mark when the information is recorded using the write strategy set by the write strategy setting means; and shift amount setting means for setting a shift amount of the 3T mark such that the lengths of the lands before and after the 3T mark become equal to each other.

Another embodiment of the present invention provides A method for recording and reproducing information by forming marks and lands in an optical information recording medium, the method comprising: recording information using a reference write strategy and an alternative write strategy in which pulse widths of 3T, 4T and 5-14T marks are individually varied by a set amount with respect to the reference write strategy; reproducing the recorded information using each of the reference write strategy and the alternative write strategy; measuring a length of each of the marks from the reproduced information; storing the measured length of each of the marks and a theoretical length of each of the marks; computing inherent contractile rates of each of the marks from the stored length of each of the marks and the stored theoretical length of each of the marks; computing a variation rate of the inherent contractile rate of each of the marks when the pulse widths of 3T, 4T and 5-14T marks are individually varied by a set amount with respect to the reference write strategy from the computed inherent contractile rate and obtaining a variance of each of the marks based on equation 2:

$$E(T) = e(4T) * \frac{R(4T)}{R(e)} + e(6T) * \frac{R(6T)}{R(e)} + \\ e(8T) * \frac{R(8T)}{R(e)} + e(10T) * \frac{R(10T)}{R(e)} + e(14T) * \frac{R(14T)}{R(e)} \quad (2)$$

where e(4T), e(6T), . . . , e(mT) represent the computed inherent contractile rates when the even pulses are varied by ϵ minimum resolution, R(iT) represents a probability of occurrence of mark iT, and R(e) is a sum of the probability of occurrence of all even marks; and setting the write strategy such that the variance when the pulse widths of 3T, 4T and 5-14T are individually varied is minimized.

Another embodiment of the present invention provides A method for recording and reproducing information by forming marks and lands in an optical information recording medium, the method comprising: recording information using a reference write strategy and an alternative write strategy in which final pulse widths of an even T mark and an odd T mark, an offset of a final pulse, and a pulse width of a 3T mark are individually varied by a set amount with respect to the reference write strategy, when the information is recorded using 2T strategy; reproducing the recorded information using each of the reference write strategy and the alternative write strategy; measuring a length of each of the 3T mark, the even T marks, and the odd T marks except for the 3T mark, from the reproduced information; storing in memory the measured length of each of the marks and a theoretical length of each of the marks; computing inherent contractile rates of the 3T mark, the even T marks, and the odd T marks except for the 3T mark, from the stored length of each of the marks and the stored theoretical length of each of the marks, and a variation rate of each of the marks when the final pulse widths, the offset of the final pulse and the pulse width of the 3T mark are varied; and setting the write strategy such that the inherent contractile rate of each of the marks approaches a set value from the computed variation rate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 17A to 17C are tables showing deviation data when data is recorded on, and reproduced from, an optical disc using a reference write strategy;

FIGS. 18A and 18B are tables showing deviation data when even T mark pulse or the odd T mark pulses are varied alone, and when the even T mark pulse and the odd T mark pulses are varied simultaneously together;

DETAILED DESCRIPTION OF THE INVENTION

An optical disc device according to one or more aspects of the present invention will now be described by way of preferred, but non-limiting, embodiments of the invention. Also, the setting of a write strategy, in particular, for a DVD-RW, will be described.

Figure 1:
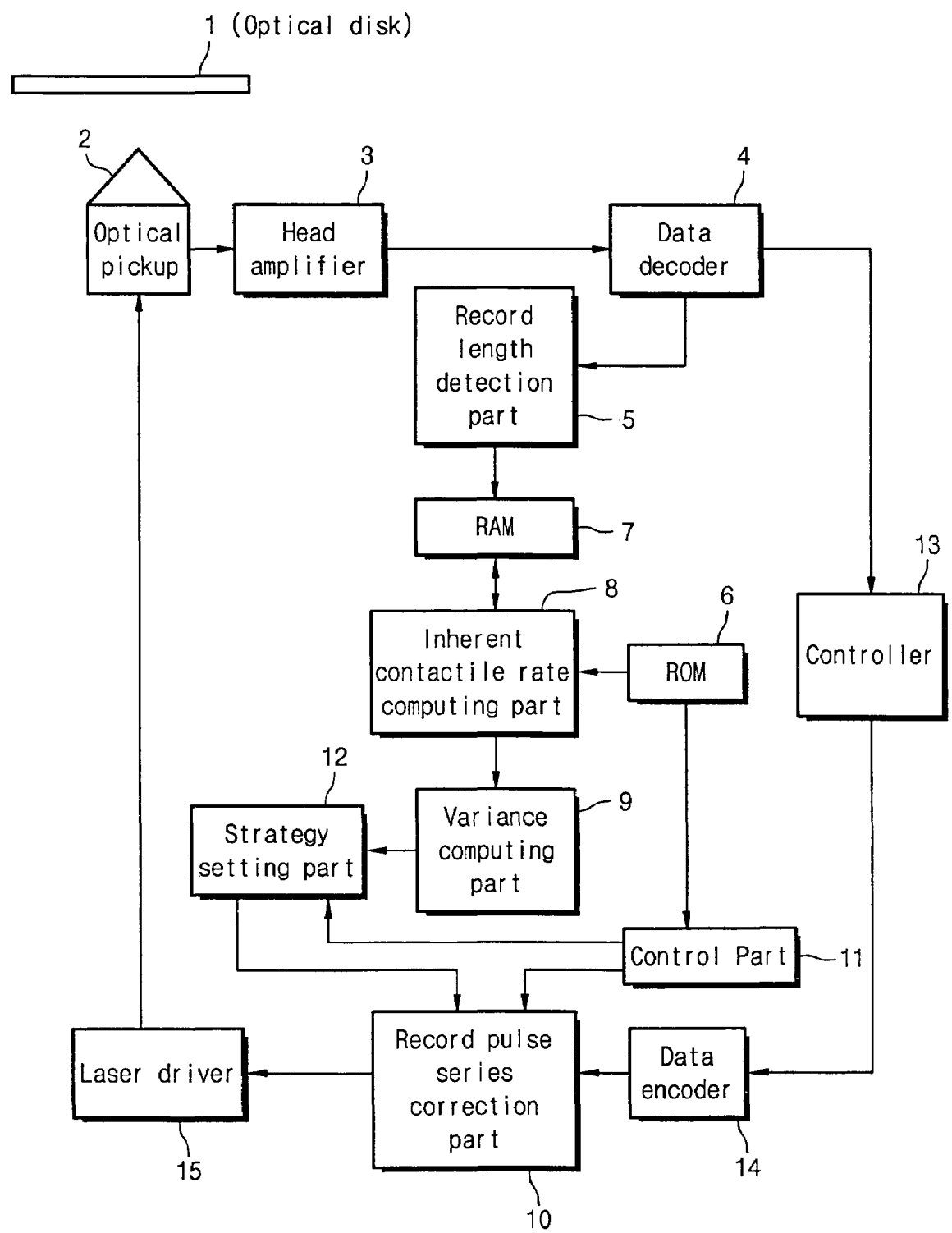
FIG. 1 is a block diagram of an optical disc device according to one embodiment.

FIG. 1 is a functional block diagram of one embodiment of an optical disc device. As will be appreciated by those skilled in the art, the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined in any physical implementation.

The optical disc device of FIG. 1 includes an optical information recording medium 1, an optical pickup 2, a head amplifier 3, a data decoder 4, a record length detection part (or mark length measuring means, land length measuring means) 5, a read only memory (ROM) (or storage means) 6, a random access memory (RAM) (or storage means) 7, an inherent contractile rate computing part (or inherent contractile rate computing means) 8, a variance computing part (or variance computing means) 9, a recording pulse series correction part (or recording means) 10, a control part (or variation rate computing means) 11, a strategy setting part (write strategy setting means) 12, a controller 13, a data encoder 14, and a laser driver 15. Hereinbelow, the deviation is often referred to as the difference between strategies that can be obtained from a signal recorded and reproduced and having different mark lengths, and the inherent contractile rate is often referred to as an amount deviated from the inherent theoretical value of the mark.

In the example of this embodiment, the optical information recording medium 1 is an optical disc that is responsive to a semiconductor laser to record and reproduce information. Examples include CD-Rs, CD-RWs, DVD Rs, DVD RWs, and DVD-RAMs. The optical pickup 2 is used to record and reproduce information on the optical disc 1. Although not shown, the optical pickup 2 of this example includes a laser beam source such as a laser diode, a collimator lens, an objective lens driven by a focus actuator or a tracking actuator, optical elements such as a polarization beam splitter or a cylindrical lens, a four-section photo-detector (PD) having four separate areas A, B, C and D that convert an incident light into electrical signals, and a front monitor diode for monitoring a laser output during recording or reproducing operations.

The head amplifier 3 is coupled to the optical pickup 2 so as to generate an RF signal corresponding to the amount (intensity) of the light incident on the respective areas of the four-section PD. The RF signal is output to the data decoder 4. In addition, the head amplifier 3 at the same time generates a focus error signal, i.e., a signal corresponding to a difference in focus of the laser beams irradiated by the optical pickup 2, using astigmatism, and generates a tracking error signal, which corresponds to a signal detecting a direct deviation of the irradiation laser of the optical pickup 2. Also, in the present embodiment, the head amplifier 3 further has a function of measuring a jitter value of the generated RF signal and a function of detecting asymmetry from the RF signal.

The data decoder 4 converts the RF signal generated by the head amplifier 3 to binary form to generate an EFM signal. Further, the data decoder 4 converts the generated EFM signal into a signal of a desired format and outputs the converted EFM signal to the controller 13.

The record length detection part 5 receives the EFM signal from the data decoder 4 and measures a pulse width of the EFM signal using a time measuring circuit (not shown).

ROM 6 is a non-rewritable storage unit which stores a control program for controlling all parts of the optical disc device. In addition, the ROM 6 stores a reference write strategy, theoretical lengths of the mark and land, the probability of occurrence of each of the marks, and the like.

RAM 7 is a rewritable storage unit which temporarily stores a measurement result of the input record length from the record length detection part 5, a deviation value between the measurement value of the record length and the theoretical lengths of the mark and land, the inherent contractile rate of the mark and land, and the like.

The inherent contractile rate computing part 8 computes the inherent contractile rate of each of the marks from the measurement result of the input record length stored in RAM 7 and the theoretical lengths of the mark and land.

The variance computing part 9 computes a variation rate of the inherent contractile rate when the information is recorded with a variety of write strategies, from the inherent contractile rate computed by the inherent contractile rate computing part 8, and computes the variance of each of the marks based on an arithmetic equation.

The recording pulse series correction part 10 receives the write strategy or parameters from the control part 11 or the strategy setting part 12 and generates the recording pulse series on the basis of the received write strategy or parameters to output the generated recording pulse series to the laser driver 15.

The control part 11 controls the whole operations of the optical disc device including information recording and reproducing according to the control program. Also, in the present embodiment, the control part 11 computes the variation rate of each of the marks when the final recording pulse width, the offset of the final recording pulse, and the pulse width of a 3T mark are varied, or it sets the shift amount of a 3T mark such that the lands located before and after the 3T mark are equal in length to each other.

In the case of a 1T strategy, the strategy setting part 12 sets a write strategy in which the variance when the pulse widths of 3T, 4T and 5-14T marks are individually varied is minimized, whereas in the case of a 2T strategy, the strategy setting part 12 sets a write strategy in which the inherent contractile rate of each of the marks approaches a predetermined value. The strategy setting part 12 outputs the set write strategies to the recording pulse series correction part 10.

The controller 13 provides the data encoder 14 with a recording signal and also reads the recording signal from the data decoder 4.

The data encoder 14 converts the recording signal provided from the controller 13 into an EFM signal or the like and outputs the converted EFM signal to the recording pulse series correction part 10.

The laser driver 15 generates a pulse signal for driving the laser diode according to the input recording pulse and provides a semiconductor laser (not shown) of the optical pickup 2 with the same.

Next, a method for setting a write strategy for an optical disc will be described with reference to FIG. 2.

In the process of recording information on the optical disc, the control part 11 first determines whether the recording strategy is a 1T strategy or a 2T strategy (S101). Herein, a 1T strategy indicates a strategy used in a recording operation up to double speed in DVD-RWs, and a 2T strategy indicates a strategy used in a high-speed recording operation faster than double speed. Details of each strategy will now be described.

In order to record information using the 1T strategy, information is first recorded using a reference write strategy and then the recorded information is reproduced to store the record length of each of the marks in RAM 7 (S102). Also, information is recorded using plural write strategies which individually shift the widths of 3T, 4T, 5-14T marks with respect to the reference write strategy, and the recorded information is reproduced to store the record lengths of the marks in RAM 7 (S103). In addition, in the case of a strategy where the widths of the 3T and 4T marks are varied, it may use a strategy which varies the 3T and 4T marks at the same time. In this case, the recording information for setting the strategy is decreased to secure a recording capacitance.

The control part 11 outputs the data stored in RAM 7 to the inherent contractile computing part 8. The inherent contractile computing part 8 computes the variation rate of the inherent contractile rate of each of the marks on the basis of the record lengths of the provided marks (S104).

The variance computing part 9 computes a strategy having a minimal variance in the inherent contractile rate of each of the marks on the basis of the inherent contractile rate of each of the marks obtained by the inherent contractile rate computing part 8, and outputs the computed strategy to the recording pulse series computing part 10 (S105).

Meanwhile, in order to record information using a 2T strategy, information is first recorded using a reference write strategy and then the recorded information is reproduced to store the record length of each of the marks in RAM 7 (S106). Also, information is recorded using a write strategy having a final pulse width deviated from the reference write strategy, and the recorded information is reproduced to store the record lengths of the marks in RAM 7 (S107). Thereafter, information is recorded using a write strategy having an offset of the final pulse deviated by a predetermined amount from the reference write strategy, and the recorded information is reproduced to store the record lengths of the marks in RAM 7 (S108). Also, information is recorded using a write strategy having a pulse width of a 3T mark deviated by a predetermined amount from the reference write strategy, and the recorded information is reproduced to store the record lengths of the marks in RAM 7 (S109).

The control part 11 outputs the data stored in RAM 7 to the inherent contractile computing part 8. The inherent contractile computing part 8 computes the variation rate of the inherent contractile rate of each of the marks on the basis of the record lengths of the marks provided from RAM 7 (S110).

The strategy setting part 12 sets a strategy having a predetermined value of inherent contractile rate in each of the marks, on the basis of the inherent contractile rate of each of the marks obtained by the inherent contractile rate computing part 8 (S111). The strategy setting part 12 outputs the set write strategy to the recording pulse series correction part 10, records the information, reproduces the recorded information (S112), measures the lengths of lands located before and after 3T mark (S113), and sets a shift amount of a 3T mark such that the lands located before and after the 3T mark are equal in length (S114).

The above procedures will now be described in detail with reference to the accompanying drawings.

Figure 3:
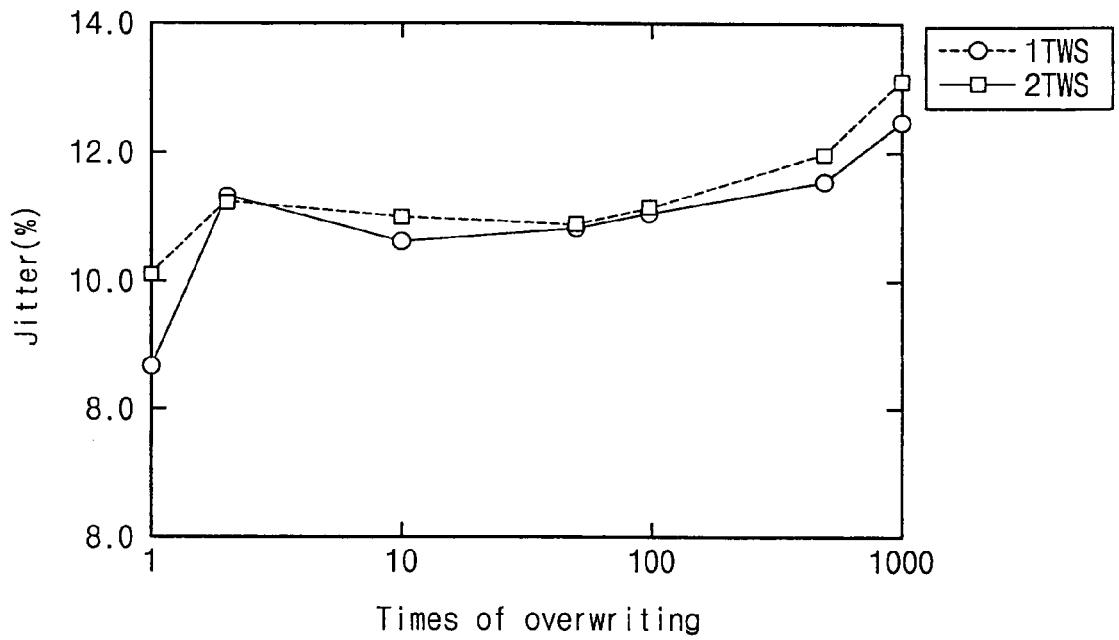
FIG. 3 is a graph showing an overwrite characteristic of a DVD-RW.

A DVD-RW disc generally applies the two strategies as mentioned above. FIG. 3 shows a variation of jitter when information overwriting is repeatedly performed at quad-speed using the 1T strategy (indicated as 1TWS in FIG. 3) and the 2T strategy (indicated as 2TWS in FIG. 3). In FIG. 3, it is seen that the jitter value deteriorates as the number of overwrite times increases compared with the jitter value in an initial state. Especially, it is seen that the jitter value after one overwrite operation is considerably high.

Figure 4:
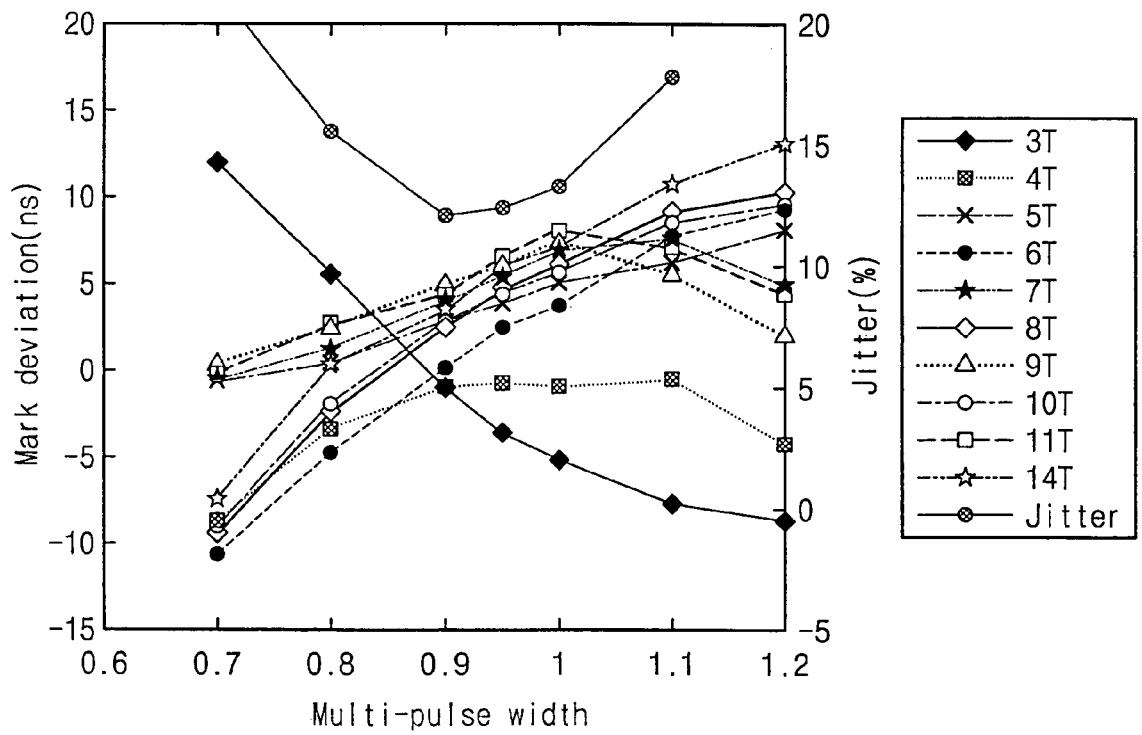
FIG. 4 is a graph showing a characteristic of a mark recorded on an optical disc when the multi-pulse width is varied and the optical disc in not overwritten.
Figure 5:
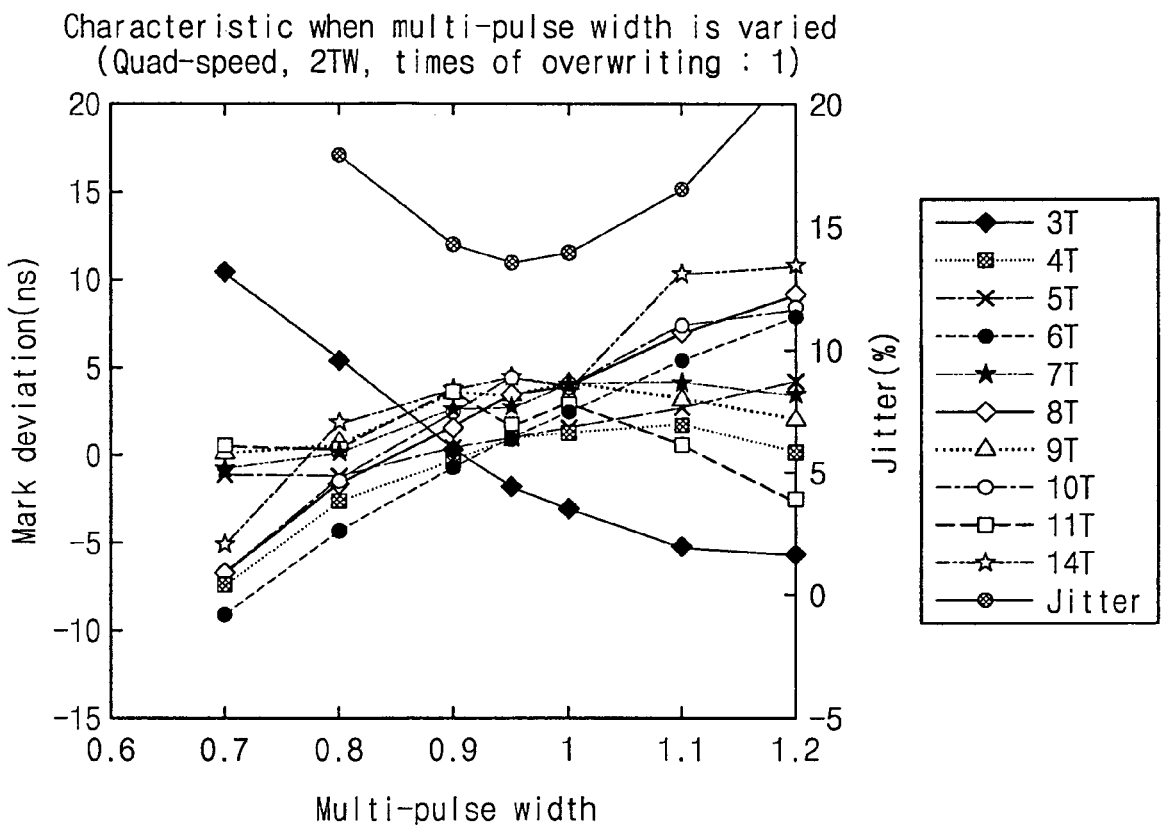
FIG. 5 is a graph showing a characteristic of a mark recorded on an optical disc when the multi-pulse width is varied and the optical disc in overwritten one (1) time.

FIGS. 4 and 5 show the jitter value and the deviation of each of the marks having lengths of 3T-11T and 14T when a multi-pulse width is varied in an initial recording operation, and in a single overwriting operation, respectively. As will be seen from FIGS. 4 and 5, there exists a best point of the jitter value between the initial recording operation and one time overwriting operation.

Accordingly, from the results of FIGS. 3 to 5, since the overwriting operation has a lower margin in the recording quality than the initial recording operation, it is preferable to set an optimal recording parameter with respect to the write strategy during the overwriting operation. To do this, the same recording operation should be performed two or more times which requires much time and effort.

Figure 6:
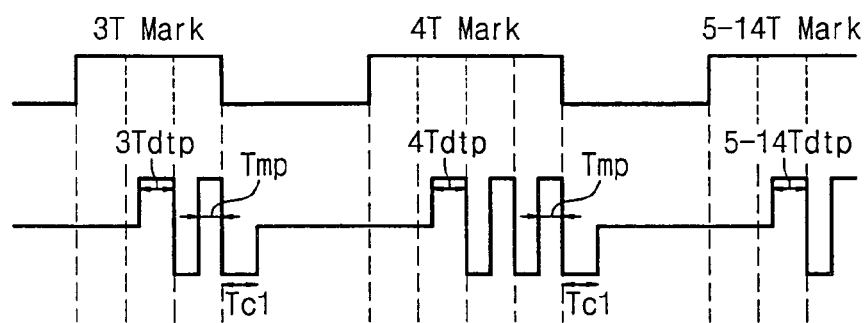
FIG. 6 is a waveform showing the construction of a 1T write strategy.

To this end, to solve such drawbacks, the write strategy should be set preferentially using a parameter greatly influencing the recording characteristic of the overwriting, like the multi-pulse width (Tm) or the final off pulse width (Tcl of FIG. 6). In other words, since Tm and Tcl are parameters common to the 1T strategy and the 2T strategy, they are set to optimal values before the process of FIG. 2 is executed. Specifically, the write strategy is set such that the jitter value after 5 overwrite operations becomes the optimal value.

Next, the 1T strategy and the 2T strategy will be described.

FIG. 6 illustrates the 1T strategy. As will be seen from FIG. 6, the 1T strategy utilizes the multi-pulse within the 1T cycle. In FIG. 6, Tmp is the width of the multi-pulse, and Tcl is the width of the off pulse. The width of the multi-pulse and the width of the off pulse are common to the 1T strategy and the 2T strategy. Also, according to the standards for DVD-RW, in addition to the multi-pulse width and the off pulse width, only the 1$^{st}$ pulse width of each of 3T, 4T and 5-14T marks can be varied.

Figure 10:
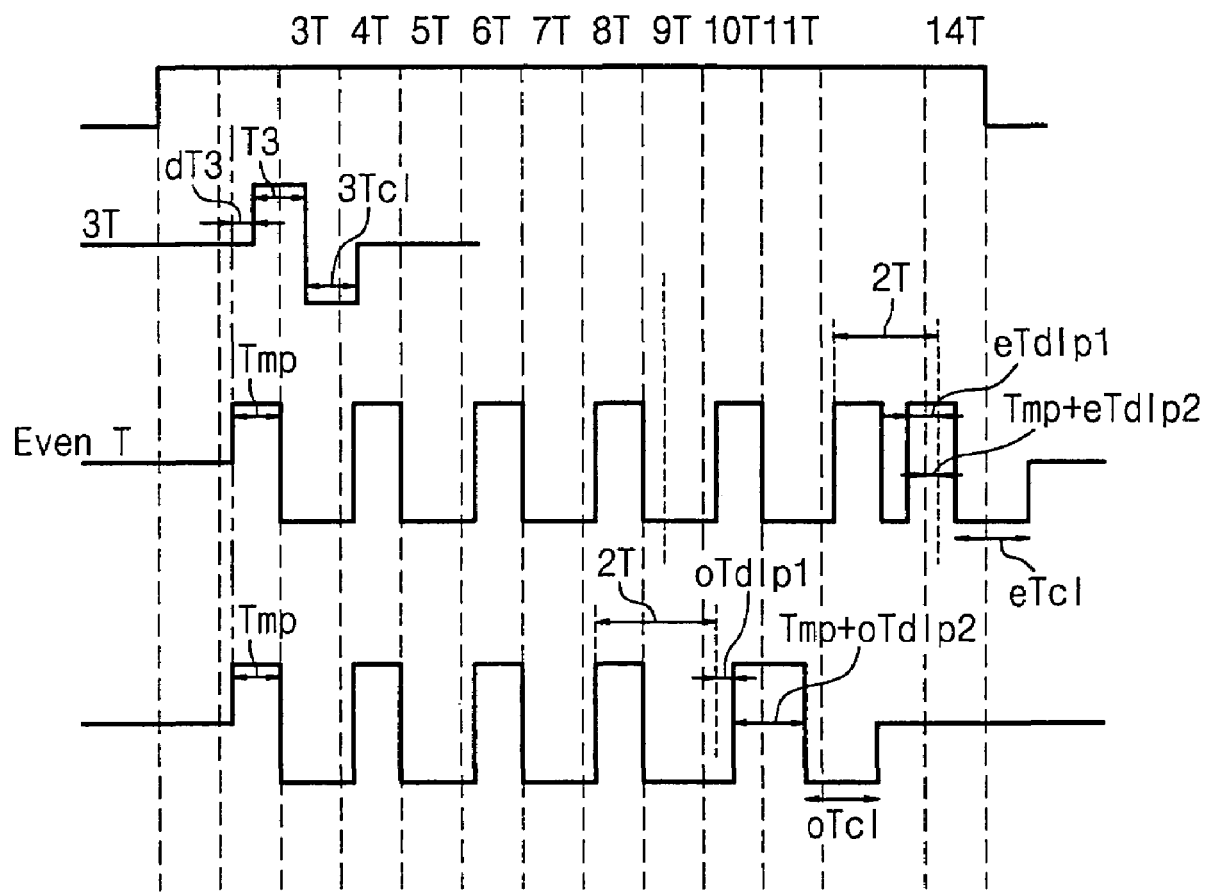
FIG. 10 is a waveform showing the construction of a 2T write strategy.

FIG. 10 illustrates the 2T strategy. As will be seen from FIG. 10, the 2T strategy represents operating the multi-pulse within the 2T cycle, and is allowed to be able to set a different strategy for each of a 3T mark, an even T mark, and an odd T mark (other than a 3T mark). In FIG. 10, dT3 represents the shift amount of a 3T mark, T3 represents the pulse width of the 3T mark, 3Tcl represents the off pulse width of the 3T mark, Tmp represents the multi-pulse width, eTdlp1 represents the shift amount of the final pulse in an even T mark, Tmp+eTdlp2 represents the pulse width of final pulse in an even T mark, eTcl represents the off pulse width of final pulse in an even T mark, oTdp1 represents the shift amount of the final pulse in an odd T mark (except for a 3T mark), Tmo+oTdlp2 represents the pulse width of final pulse in an odd T mark(except for a 3T mark), and oTcl represents the off pulse width of the final pulse in an odd T mark (except for a 3T mark). The 2T strategy can set these values. Also, the multi-pulse width Tmp and the off pulse width Tcl are common, to the 1T and 2T strategies.

Having the above definitions in mind, a method for setting the 1T strategy will now be described.

Figure 7:
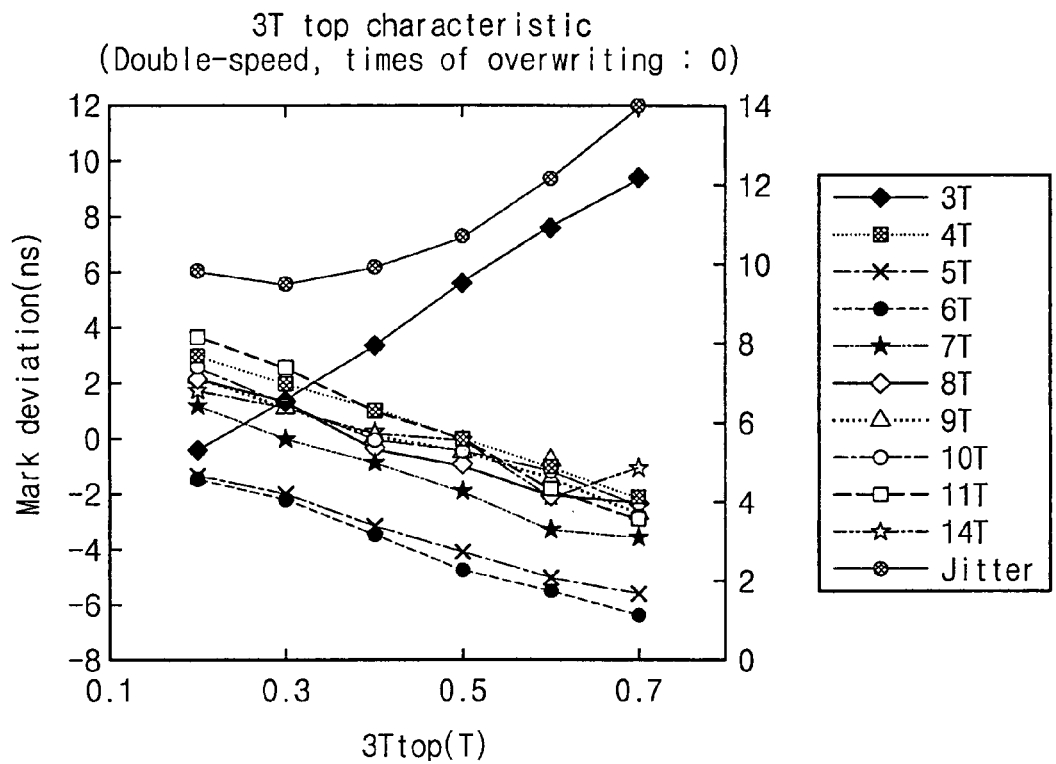
FIG. 7 is a graph showing a characteristic when a pulse width of a 3T mark is varied in the 1T strategy.
Figure 8:
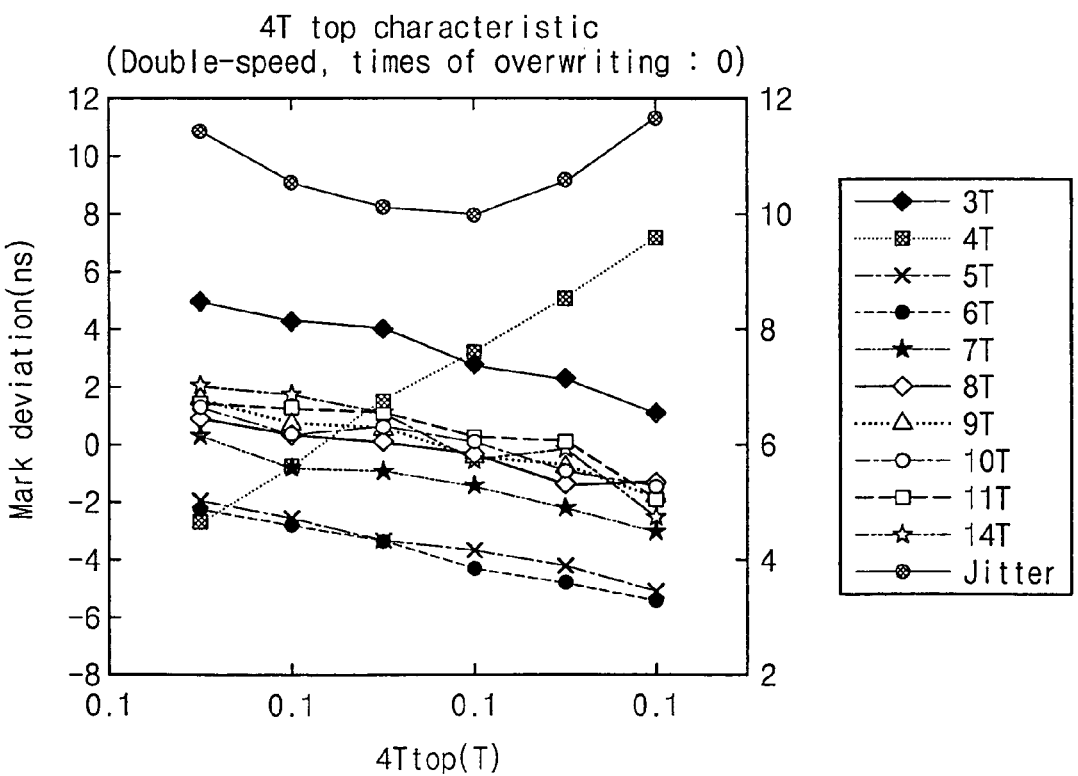
FIG. 8 is a graph showing a characteristic when $1^{st}$ pulse width of a 4T mark is varied in the 1T strategy.

FIG. 7 shows variations in widths and jitter values of marks when Tm and Tcl are set to be optimal values, an initial recording is performed at double speed using the 1T strategy and the width of 3T mark is varied by varying the 1$^{st}$ pulse width of the 3T mark. Likewise, FIG. 8 shows variations in widths and jitter values of marks when Tm and Tcl are set to be optimal values, an initial recording is performed at double speed using the 1T strategy and the width of 4T mark is varied by varying the 1$^{st}$ pulse width of the 4T mark. From FIGS. 7 and 8, it is seen that a point where the deviation of the targeted mark, i.e. the 3T mark or 4T mark, approaches zero (0) is slightly mismatched with a point where the jitter value is best.

In general, if the record length of a mark or land is equal to the theoretical length, the jitter value becomes an optimal value. However, in reality, it is necessary to consider the balance of the lengths of the lands located before and after the mark as well. Since a DVD-R has a function to shift the mark forward or backward, it is possible to correct such a slight mismatch by using the function.

However, a DVD-RW does not have such a function. To this end, as expressed by equation 1 below, a variance of the deviations is obtained from the deviation of each of the marks, a mean value of the deviations of all the marks, and the probability of occurrence of each of the marks, and the width of each of the marks where the variance value is minimized is obtained:

$$K = \sum_{i=3}^{14} (dev(iT) - Avg)^2 * R(iT), \quad (1)$$

where dev(iT) is the deviation of the 1T mark; "Avg" is the mean value of the deviations of all the marks; and where R(iT) is the probability of occurrence of mark iT and is a known value.

Figure 2:
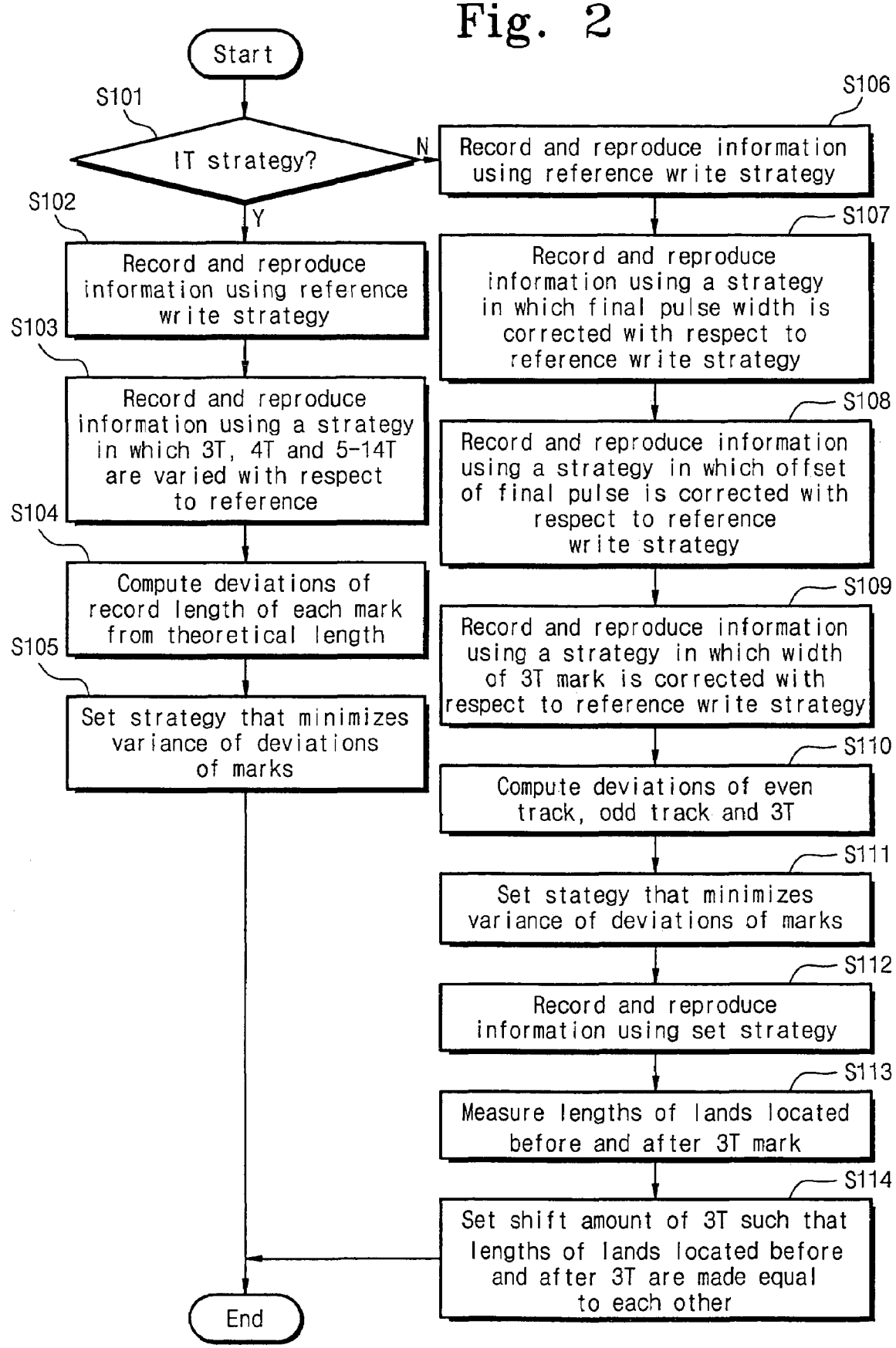
FIG. 2 is a flow chart of a method of setting a write strategy for an optical disc.

On reason to employ the above method is because the point where the variance of deviations of the marks is minimized is matched with the point where the jitter value is an optimal value (this corresponds to S105 of FIG. 2).

Figure 9:
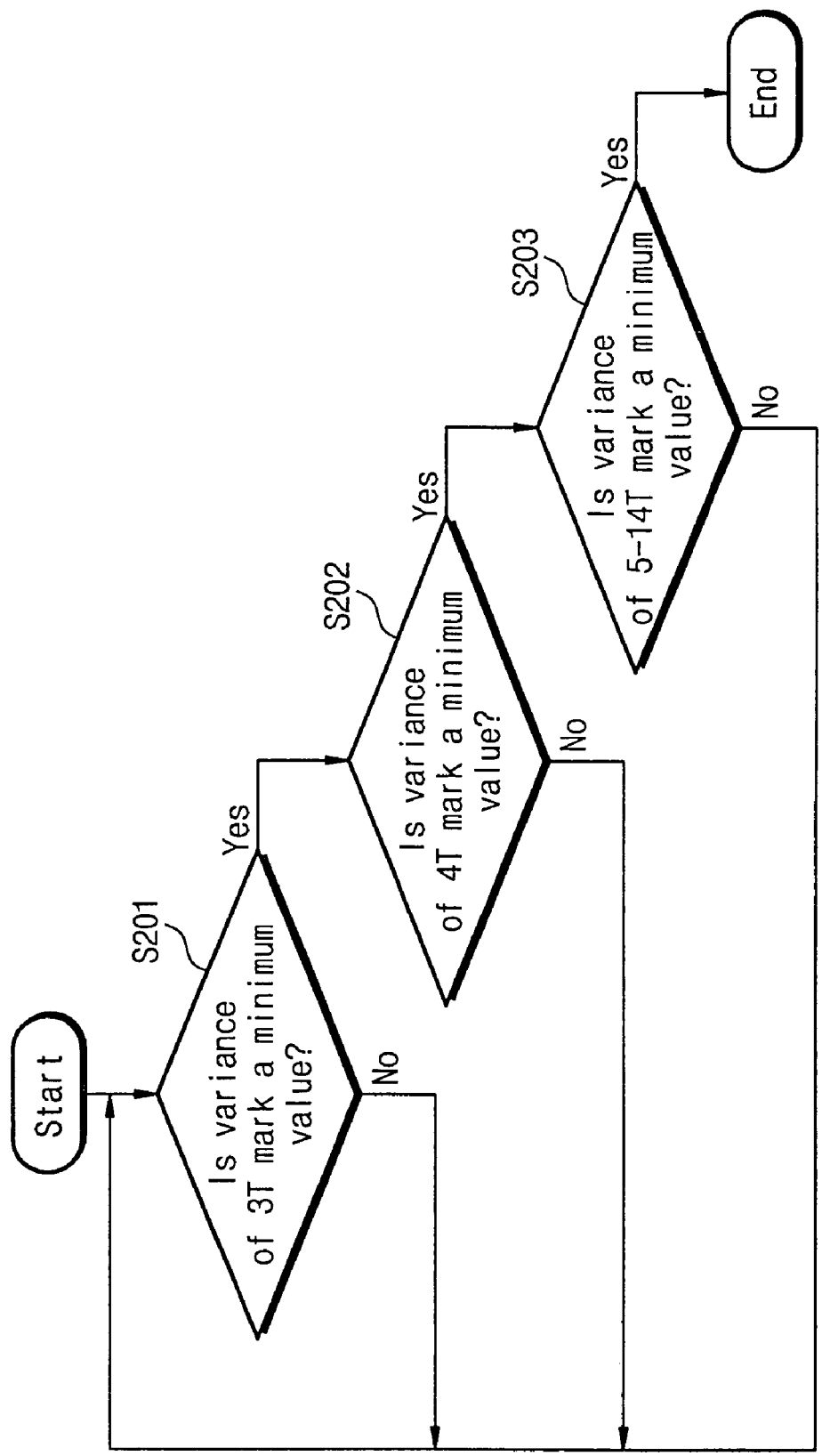
FIG. 9 is a flow chart showing an adjustment procedure in the 1T write strategy.

Specifically, as shown in FIG. 9, the width of a 3T mark (having the highest probability of occurrence) where the variance of deviations is minimized is obtained by an operation (S201). Also, as will be seen from FIGS. 7 and 8, the variation in deviation of each of the marks is linear. Accordingly, the deviation of each of the marks is measured by varying the 1$^{st}$ pulse width of the 3T mark at 2 points, and a straight line is obtained based on the obtained deviation values, so that the deviation of each of the marks and the mean value of deviations of the all the marks when the 1$^{st}$ pulse width of 3T mark is varied can be obtained by an operation without performing a recording operation. In other words, the steps S102 and S103 of FIG. 2 correspond to an information reproducing operation to obtain a straight line showing the variation of deviations of the marks.

Next, the 1st pulse width of the 4T mark is obtained such that the variance of deviations is minimized (S202). At this time, the variance of deviations of a 3T mark is obtained, and it is determined whether or not the variance of deviations of the 3T mark is a minimal value. As a result of the determination when the variance of deviations of the 3T mark is not a minimal value, the 1st pulse width of the 3T mark is obtained, and then the 1st pulse width of the 4T mark is obtained such that the variance of deviations is minimized. Meanwhile, when the variance of deviations of 3T mark is a minimal value, the 1st pulse width of the 5-14T marks is obtained such that the variance of deviations of the 5-14T marks is minimized (S203).

The reason that the deviations of the marks are obtained in the order from the highest probability of occurrence to the lowest probability of occurrence is because the higher the probability of a mark occurring is, the higher the influence of the corresponding mark on other marks is. Accordingly, by performing such a process, an optimal variance can be obtained.

Next, a method for setting the 2T strategy will be described.

Figure 11:
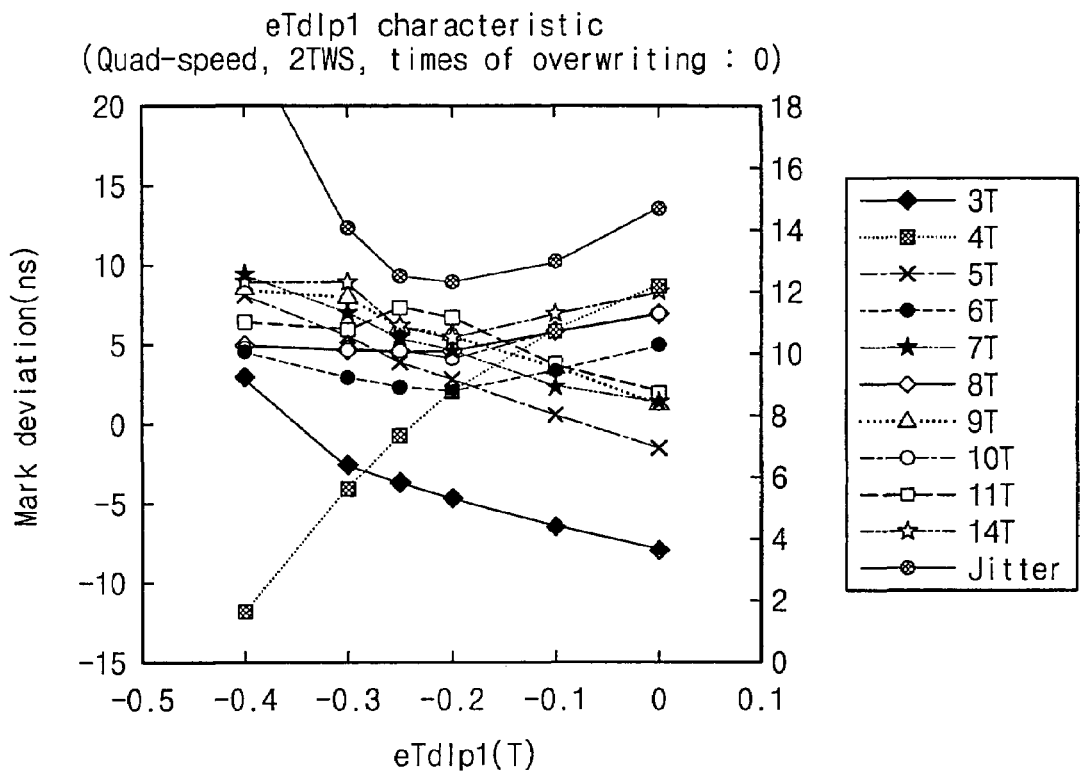
FIG. 11 is a graph showing a characteristic when the offset amount of a final pulse of an even T mark is varied in the 2T write strategy.

FIG. 11 shows variations in widths and jitter values of marks when an initial recording is performed at quad-speed using 2T strategy and the offset amount of the final pulse of an even T mark is varied. Likewise, FIG. 12 shows variations in widths and jitter values of marks when an initial recording is performed at quad-speed using 2T strategy and the offset amount of the final pulse of an odd T mark is varied.

Figure 12:
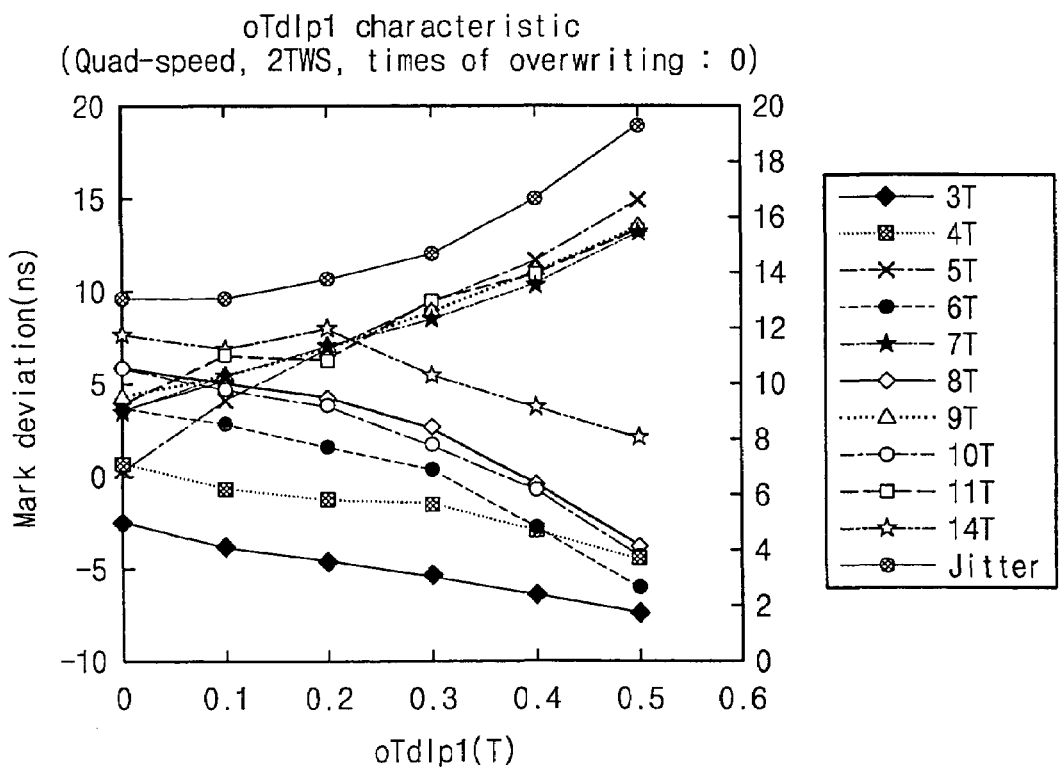
FIG. 12 is a graph showing a characteristic when the offset amount of a final pulse of an odd T mark is varied in the 2T write strategy.

From FIGS. 11 and 12, it is seen that the variations in the even T marks, for example, 4T, 6T, 8T and 10T marks are almost linear, and the variation in the odd T marks, for example, 5T, 7T, 9T and 11T marks, are almost linear approaching a rectilinear form. In other words, by varying the offset amounts of the final pulses of the even T marks and the odd T marks at selected two points, the variation rate of each mark can be obtained. To obtain the variation rate, the data obtained in the steps of S106 and S108 in FIG. 2 is used. Also, in the case of similar rectilinear figures, there exists a point approaching the deviation in the even T mark of FIG. 11, and a point approaching the deviation in the odd T mark of FIG. 12. This shows that by varying the offset amount of the final pulse, the deviation corresponding to the even T marks or odd T marks can be adjusted. The concrete operation corresponds to the step S110 of FIG. 2.

Figure 13:
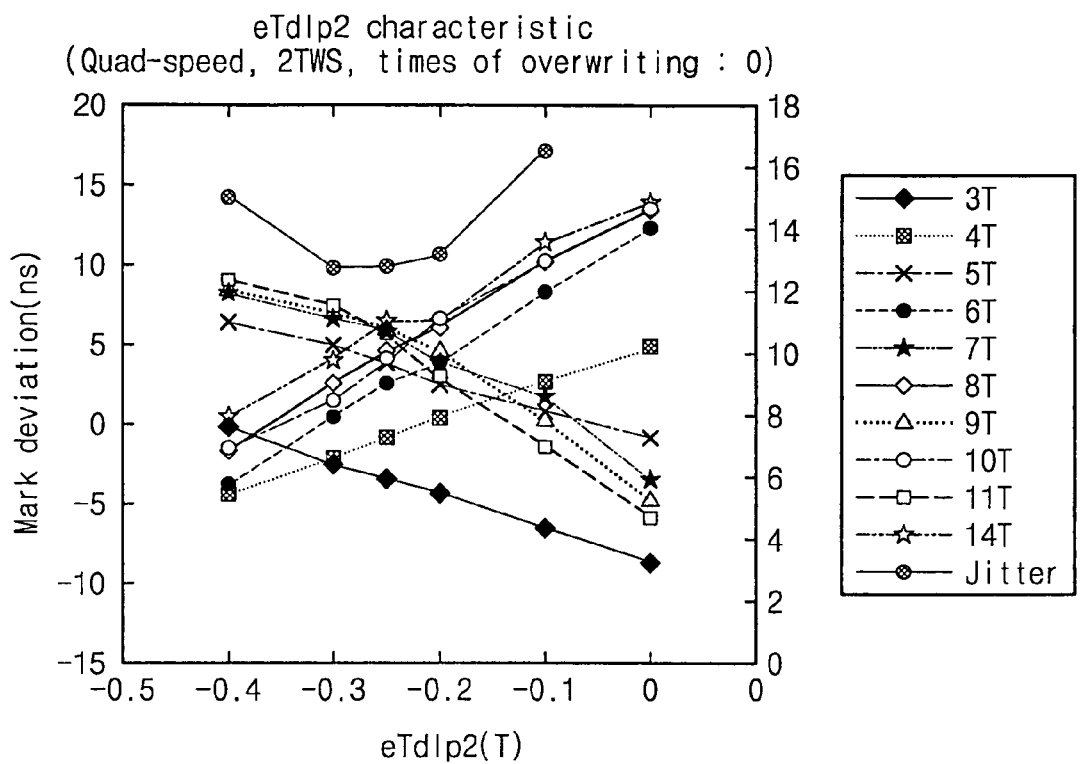
FIG. 13 is a graph showing a characteristic when a final pulse width of an even T mark is varied in the 2T write strategy.

FIG. 13 shows variations in widths and jitter values of marks when an initial recording is performed at quad-speed using the 2T strategy and the pulse width of the final pulse of an even T mark is varied. Likewise, FIG. 14 shows variations in widths and jitter values of marks when an initial recording is performed at quad-speed using the 2T strategy and the pulse width of the final pulse of an odd T mark is varied.

Figure 14:
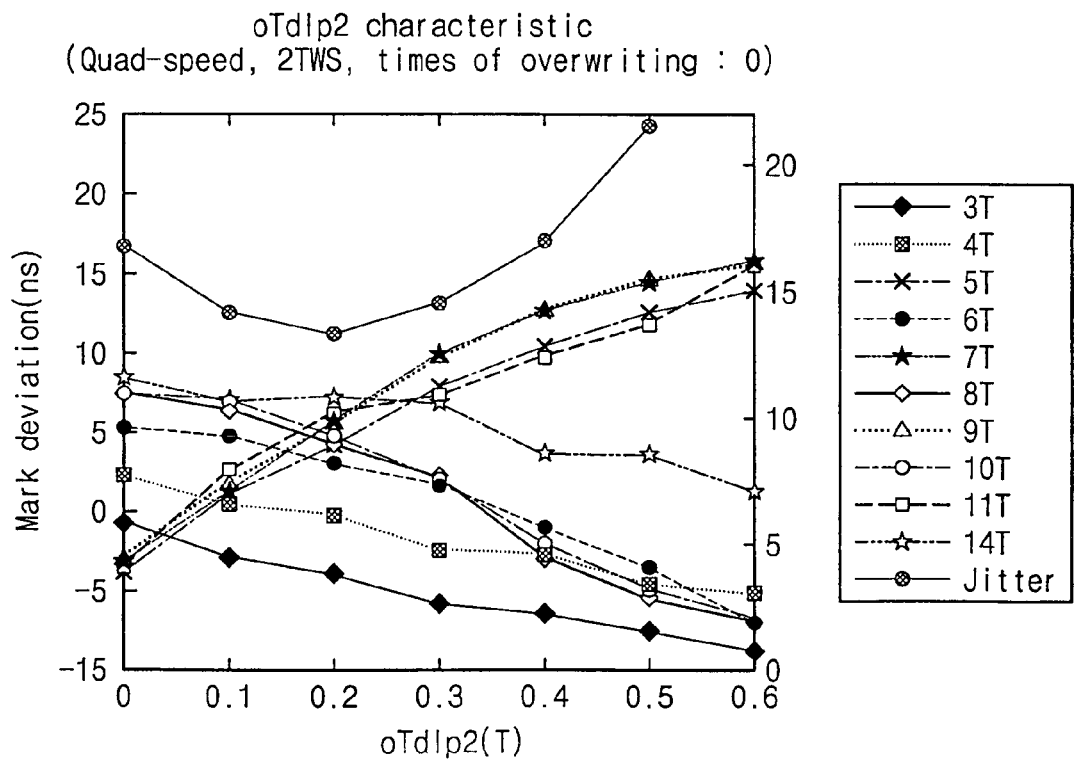
FIG. 14 is a graph showing a characteristic when a final pulse width of an odd T mark is varied in the 2T write strategy.

From FIGS. 13 and 14, it is confirmed that both the variations of deviations in the even T mark and the odd T mark are linear. Accordingly, by varying the widths of the final pulses of the even T and the odd T at selected two points, the variation rate of each mark can be obtained. To obtain the variation rate, the data obtained in the steps of S106 and S107 of FIG. 2 is used.

Also, in comparison with FIGS. 7 and 8, where the offset of the final pulse is varied, FIGS. 11 and 12 show that the deviation in the inclination of the even T marks and the odd T marks is less. Accordingly, as mentioned above, by varying the offset amount of the final pulse, a point where the deviation of the even T marks becomes equal to the deviation of the odd T marks is selected, and then by adjusting the pulse width of the final pulse, it is possible to make the deviations of the even T marks and the odd T marks close to a predetermined value. The concrete process corresponds to the step S110 of FIG. 2.

Figure 15:
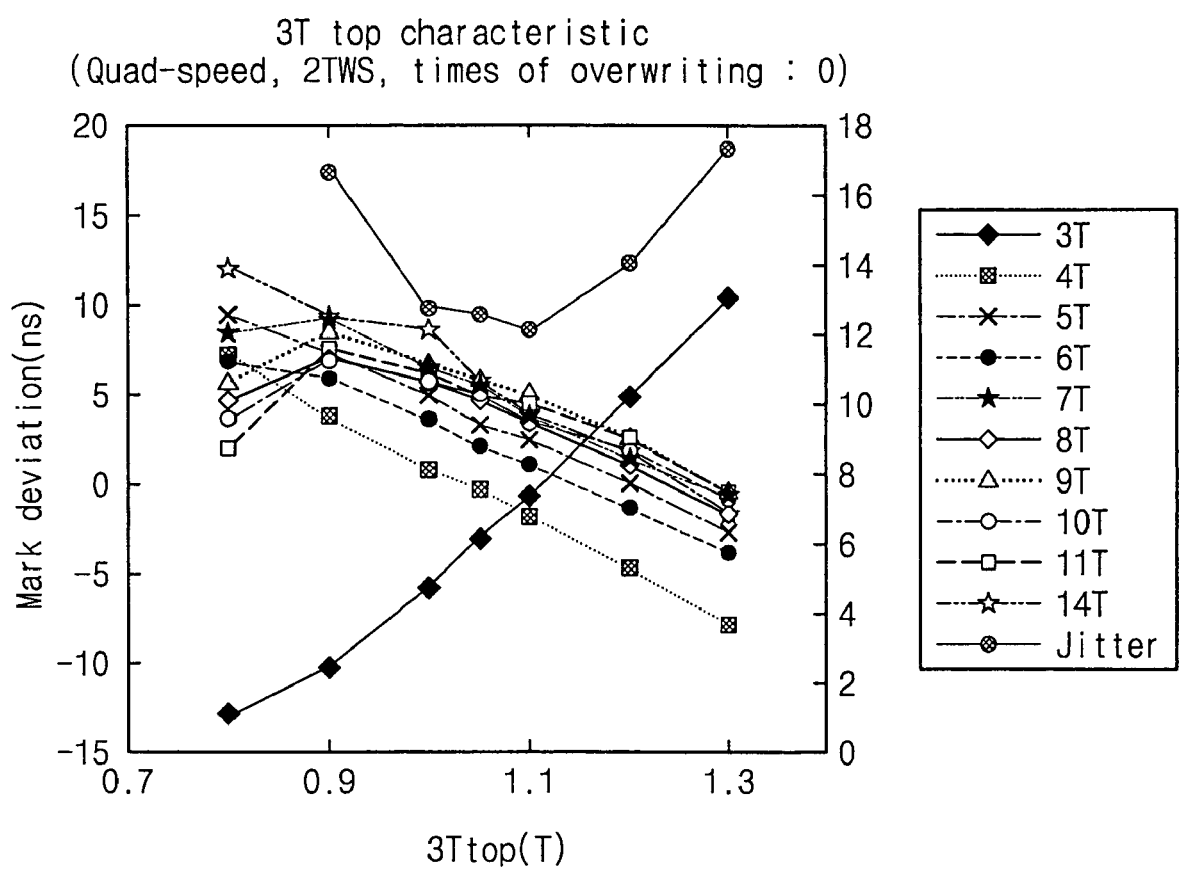
FIG. 15 is a graph showing a characteristic when a pulse width of a 3T mark is varied in the 2T write strategy.

FIG. 15 shows variations in widths and jitter values of marks when an initial recording is performed at quad-speed using the 2T strategy, and only the pulse width of the 3T mark is varied. From FIG. 15, it is seen that the deviation of inclination within the even T marks and the odd T marks is less. Accordingly, by varying the pulse width of the 3T mark at two selected points, the variation rate of each mark can be obtained. To obtain the variation rate, the data obtained in the steps of S106 and S109 is used.

As aforementioned, by alternatively varying the offsets and widths of the final pulses of the even T and the odd T, and the pulse width of the 3T mark, it is possible to make the deviation of each of the marks close to a predetermined value. In other words, by adjusting the offset of the final pulse, the inner deviations of the even T marks and the odd T marks are decreased and made close to a selected value, and by adjusting the widths of the 3T mark and the final pulse, it is possible to make the deviations of each of the marks close to a predetermined value. The concrete process corresponds to-the step S111 of FIG. 2.

Figure 16:
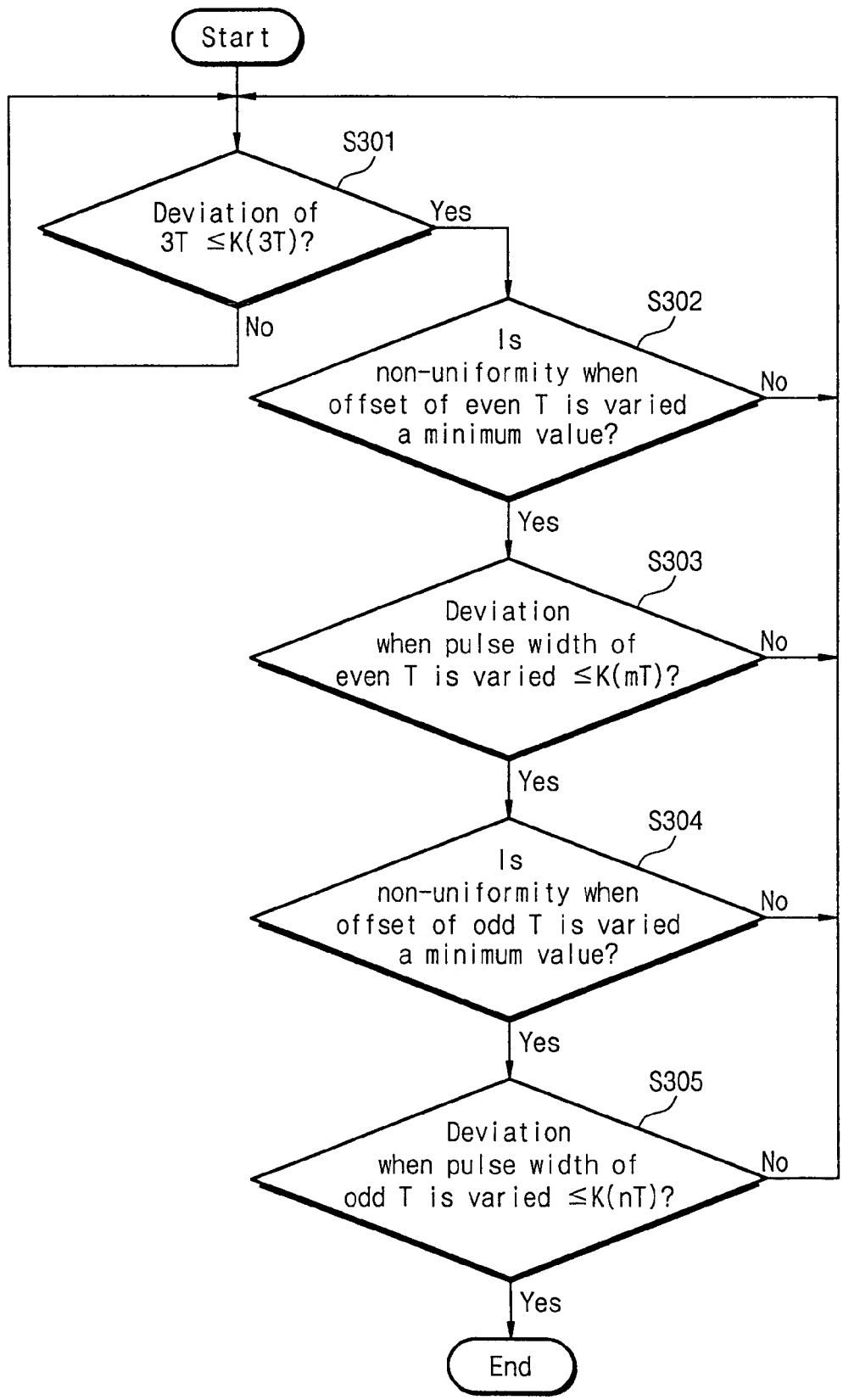
FIG. 16 is a flow chart showing a procedure for setting a strategy that minimizes the variance of the deviation of the marks recorded in an optical disc.

Specifically, as shown in FIG. 16, a 3T mark having a great influence on other marks and the highest probability of occurrence is set. In this setting, information is recorded using a record length of the 3T mark, which is measured after recording information using a reference write strategy stored in RAM 7 and reproducing the recorded information, and using a write strategy which allows the pulse width of the 3T mark to deviate by a predetermined amount with respect to the reference write strategy. A deviation is obtained from each of the measured record lengths of each of the 3T marks and the theoretical length stored in ROM 6, a straight line is obtained from the two deviations, and an inherent contractile rate 'K(3T)' of the 3T mark is obtained from the straight line. From the straight line, the pulse width of the 3T mark which allows the deviation of 3T mark to be closest to a predetermined value is set (S301).

Next, in step S302, information is recorded using a record length of an even T mark, which is measured after recording information using a reference write strategy stored in RAM 7 and reproducing the recorded information, and using a write strategy which allows the offset of the final pulse to deviate by a predetermined amount with respect to the reference write strategy. A deviation is obtained from the measured record lengths of each of the even T marks and the theoretical length of each of the even T marks, a straight line is obtained from the two deviations, and an inherent contractile rate 'K(3T)' of a 3T mark is obtained from the straight line. From the straight line showing the variation of deviation in the even T mark, the offset amount of the final pulse which minimizes the non-uniformity of deviation of the even T mark is set (S302).

The deviation of the 3T mark is confirmed and it is determined whether the confirmed deviation value is equal to or less than K(3T). As a result of that determination, when the confirmed deviation value is greater than K(3T), then the pulse width of the 3T mark is again set such that the deviation of the 3T mark is equal to or less than K(3T), and the offset amount of the final pulse of the even T mark is again set such that the non-uniformity of deviation of each of the marks is minimized. Meanwhile, when the deviation of the 3T mark is equal to or less than K(3T), the operation proceeds to the step S303.

In the step S303, information is recorded using a record length of an even T mark, which is measured after recording information using a reference write strategy stored in RAM 7 and reproducing the recorded information, and using a write strategy which allows the final pulse width to deviate by a predetermined amount with respect to the reference write strategy. A deviation is obtained from the measured record lengths of each of the even T marks and the theoretical length of each of the even T marks, a straight line is obtained from the two deviations, and an inherent contractile rate 'K(mT)' of the even T marks is obtained from the straight line. From the obtained straight line showing the variation of deviation in the even T marks, the final pulse width such that the deviation of the even T marks is equal to or less than K(mT) is set (S303).

At this time, it is determined whether the deviation of the 3T mark is equal to or less than K(3T) and the non-uniformity of deviation of each of the even T marks is a minimum value. As a result of that determination, when the confirmed deviation value of the 3T mark is greater than K(3T) or the non-uniformity of deviation of each of the even T marks is not a minimum value, then the pulse width of the 3T mark is again set. Meanwhile, when the deviation of 3T mark is equal to or less than K(3T) and the non-uniformity of deviation of each of the even T marks is a minimum value, the operation proceeds to the step S304.

In the step S304, information is recorded using a record length of an odd T mark, which is measured after recording information using a reference write strategy stored in RAM 7 and reproducing the recorded information, and using a write strategy which allows the final pulse offset to deviate by a predetermined amount with respect to the reference write strategy. A deviation is obtained from the measured record lengths of each of the odd T marks and the theoretical length of each of the odd T marks, and a straight line is obtained from the two deviations. From the straight line, the offset amount of the final pulse which minimizes the non-uniformity of the deviation of each of the odd T marks is set (S304).

At this time, it is determined whether the deviation of the 3T mark is equal to or less than K(3T), the non-uniformity of deviation of each of the odd T marks is a minimum value, and the deviation of each of the odd T marks is equal to or less than K(mT). As a result of that determination, when the deviation value is greater than K(3T), the non-uniformity of deviation of each of the odd T marks is not a minimum value, or the deviation of each of the odd T marks is greater than K(mT), then the offset amount of the final pulse is again set. Meanwhile, when the deviation of the 3T mark is equal to or less than K(3T), the non-uniformity of deviation of each of the odd T marks is a minimum value, and the deviation of each of the odd T marks is equal to or less than K(mT), then the operation proceeds to the step S305.

In the step S305, information is recorded using a record length of an odd T mark, which is measured after recording information using a reference write strategy stored in RAM 7 and reproducing the recorded information, and a write strategy which allows the final pulse width from deviating by a predetermined amount with respect to the reference write strategy. A deviation is obtained from each of the measured record length of each of the odd T marks and the theoretical length of each of the odd T marks, a straight line is obtained from the obtained two deviations, and an inherent contractile rate 'K(nT)' is obtained from the obtained straight line. From the straight line, the final pulse width of the odd T mark such that the deviation of each of the odd T marks is equal to or less than K(nT) is set (S305).

At this time, it is determined whether the deviation of the 3T mark is equal to or less than K(3T), the deviation of each even T mark is equal to or less than K(mT), and the non-uniformity of deviation of each of the odd T marks is a minimum value. As a result of that determination, when the deviation value of the 3T mark is greater than K(3T), the deviation of each even T mark is greater than K(mT), or the non-uniformity of deviation of each of the odd T marks is not a minimum value, then the final pulse width of the odd T mark is again set. Meanwhile, when the deviation of the 3T mark is equal to or less than K(3T), the non-uniformity of deviation of each of the even T marks is a minimum value, the deviation of each of the even T marks is equal to or less than K(mT), and the non-uniformity of deviation of each of the odd T marks is a minimum value, then the process ends.

In the above embodiment, in relation to the setting of parameters, five types of write strategies are exemplified: 1) a reference write strategy; 2) a strategy in which the final pulse offset of the even T marks is varied with respect to the reference write strategy; 3) a strategy in which the final pulse width of the even T marks is varied with respect to the reference write strategy; 4) a strategy in which the final pulse offset of the odd T marks is varied with respect to the reference write strategy; 5) a strategy in which the final pulse width of the odd T marks is varied with respect to the reference write strategy. However, the method of the above embodiment has a drawback in that the record capacitance having a limitation is mischievously wasted. To this end, the following embodiment provides a method for recording information using a strategy in which the final pulse width and the final pulse offset are substantially simultaneously varied in the even T marks and the odd T marks, to obtain data which is the same as that in the method of the above embodiment.

The method will now be described with reference to FIGS. 17 and 18.

FIG. 17A shows: (1) deviations when information is recorded and reproduced using the reference write strategy ('Ref.'); (2) deviations when information is recorded and reproduced using a write strategy in which the final pulse width of the even T marks is varied with respect to the reference write strategy ('eTdlp1'); (3) deviations when information is recorded and reproduced using a write strategy in which the final pulse width of the odd T marks is varied with respect to the reference write strategy ('oTdlp1'); and (4) deviations when information is recorded and reproduced using a write strategy in which the final pulse widths of the evens T mark and the odd T marks are substantially simultaneously varied with respect to the reference write strategy ('e-oTdlp1').

FIG. 17B shows values which are obtained by dividing the difference between each of eTdlp1, oTdlp1 and e-oTdlp1, and Ref, by two (2). For example, the first column represents the eTdlp1 values of FIG. 17A (−4.415), minus the Ref values of FIG. 17A (−2.368), and divided by two (2), i.e.: (−4.415−(−2.368))/2=−1.0235.

In FIG. 17C, e(4T), e(6T), . . . , e(mT) represent variation rates (or inherent contractile rates) when the even pulses are varied by a minimum resolution, o(5T), o(7T), . . . , o(nT) represent variation rates (or inherent contractile rates) when the odd pulses are varied by a minimum resolution, and Δ3T, Δ4T, . . . , ΔmT represent difference values when the even T marks and the odd T marks are substantially simultaneously varied. Also, the difference values between each of eTdlp1, oTdlp1 and e-oTdlp1, and Ref, divided by 2, as shown in FIG. 17B, provide the deviations when the pulses are varied by a minimum resolution, because the variation rates of pulses shown in FIG. 17A are made two times as large as the minimum resolution.

Assuming that a total sum of variation rates when only the even pulses are varied is E(T), and a total sum of variation rates when only the odd pulses are varied is O(T), then E(T) and O(T) can be expressed by the following equations 2 and 3:

$$E(T) = e(4T) * \frac{R(4T)}{R(e)} + e(6T) * \frac{R(6T)}{R(e)} + \quad (2)$$
$$e(8T) * \frac{R(8T)}{R(e)} + e(10T) * \frac{R(10T)}{R(e)} + e(14T) * \frac{R(14T)}{R(e)}$$

$$O(T) = \quad (3)$$
$$o(5T) * \frac{R(5T)}{R(e)} + o(7T) * \frac{R(7T)}{R(e)} + o(9T) * \frac{R(9T)}{R(e)} + o(11T) * \frac{R(11T)}{R(e)}.$$

Also, for simplification of computation, when it is assumed that a sum of existing probabilities of even T marks is R(e), and a sum of existing probabilities of odd T marks (except for the 3T mark) is R(o), then R(e) and R(o) can be expressed by the following equations 4 and 5:

$$R(e) = R(4T) + R(6T) + R(8T) + R(10T) + R(14T); \quad (4)$$

$$R(o) = R(5T) + R(7T) + R(9T) + R(11T). \quad (5)$$

In FIG. 17B, the variation rates of the 3T marks when the even pulses and the odd pulses are substantially simultaneously varied are regarded as a counteraction, which can be expressed by the following equation 6:

$$\Delta 3(T) = E(T) * \frac{-R(e)}{1-R(e)} + O(T) * \frac{-R(o)}{1-R(o)}. \quad (6)$$

Also, since the variation rate of the even T marks should consider the variation amount of the even T mark itself, and the influence of the odd T mark added thereto, the variation rate of the even T marks can be expressed by the following equation 7:

$$\Delta 4(T) = e(4T) - O(T) * \frac{R(o)}{1-R(o)}; \quad (7)$$

$$\Delta 6(T) = e(6T) - O(T) * \frac{R(o)}{1-R(o)};$$

$$\Delta 14(T) = e(14T) - O(T) * \frac{R(o)}{1-R(o)}.$$

Further, the variation rate of the odd T marks can be expressed by the following equation 8:

$$\Delta 5(T) = o(5T) - E(T) * \frac{R(e)}{1-R(e)}; \quad (8)$$

$$\Delta 7(T) = o(7T) - E(T) * \frac{R(e)}{1-R(e)};$$

$$\Delta 11(T) = o(11T) - E(T) * \frac{R(e)}{1-R(e)}.$$

The inherent contractile rates e(mT) and o(nT) can be obtained using equations 6 to 8, and can be expressed by the following equation 9:

$$e(4T) = \Delta 4T + O(T) * \frac{R(o)}{1-R(o)} \quad (9)$$

$$= \Delta 4T + (Ko - \Delta 3T) * (1 - R(o)) * \frac{R(o)}{1-R(o)};$$

$$= \Delta 4T + (Ko - \Delta 3T) * R(o)$$

$$e(6T) = \Delta 6T + (Ko - \Delta 3T) * R(o);$$

$$e(8T) = \Delta 8T + (Ko - \Delta 3T) * R(o);$$

$$e(10T) = \Delta 10T + (Ko - \Delta 3T) * R(o);$$

$$e(14T) = \Delta 14T + (Ko - \Delta 3T) * R(o);$$

$$o(5T) = \Delta 5T + (Ke - \Delta 3T) * R(e);$$

$$o(7T) = \Delta 7T + (Ke - \Delta 3T) * R(e);$$

$$o(9T) = \Delta 9T + (Ke - \Delta 3T) * R(e);$$

$$o(11T) = \Delta 11T + (Ke - \Delta 3T) * R(e).$$

In the above equation, Ko and Ke can be expressed by the following equations 10 and 11 respectively:

$$Ko = O(T) - E(T) * \frac{R(e)}{1-R(e)} \quad (10)$$

$$Ke = E(T) - O(T) * \frac{R(o)}{1-R(o)}. \quad (11)$$

FIGS. 18A and 18B show a case where the even T mark pulse or the odd T mark pulse is varied alone, and a case where the even T mark pulse and the odd T mark pulse are substantially simultaneously varied, and the variation rate of each mark is computed using the above equations, respectively. In FIGS. 18A and 18B, it can be seen that the results of the two cases correspond with each other. Also, as of T increases, the deviation increases since the number of data sample is small. To this end, in the case of T having a large value, a weighted average value is used.

Figure 19:
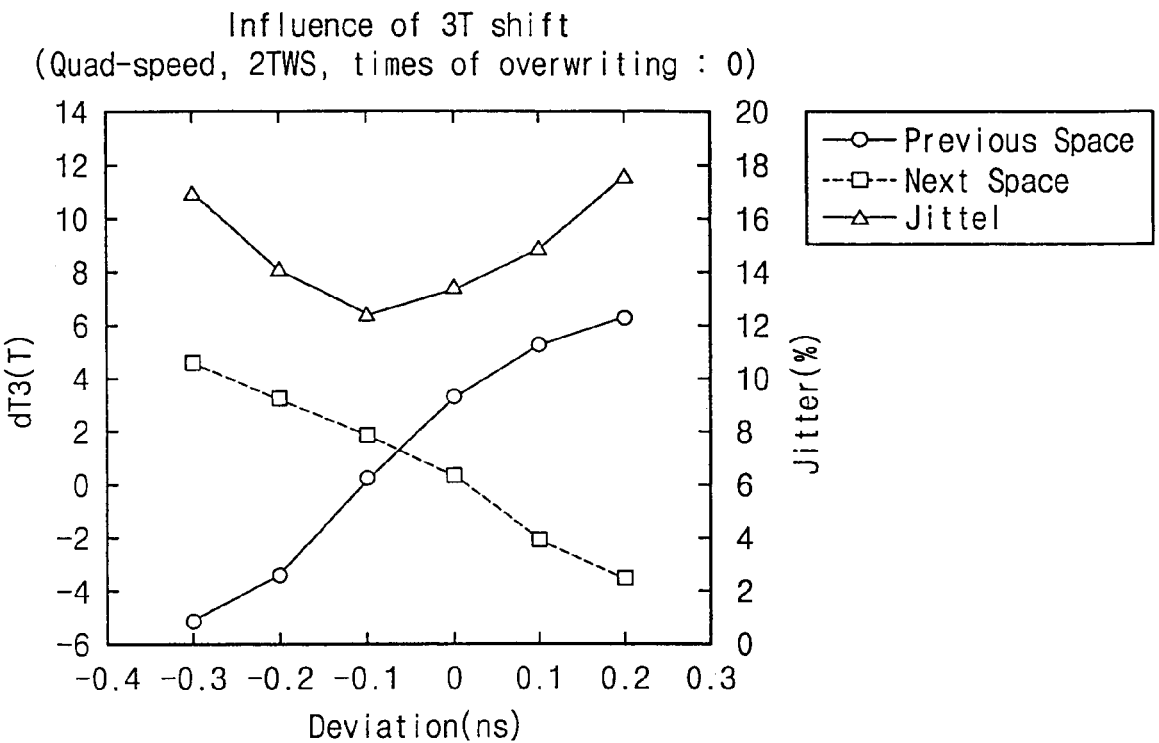
FIG. 19 is a graph showing a characteristic when a 3T mark is shifted.

FIG. 19 shows a relationship between the lengths of lands located before and after a 3T mark, and the jitter. As will be seen from FIG. 19, a point where the length of the previous land corresponds with the length of the next land is an optimal point. Accordingly, by setting the 2T strategy, fixing the width of 3T mark, and shifting the 3T mark such that the lengths of lands located before and after the 3T mark are made equal to each other, the optimization of the strategy can be achieved. This process specifically corresponds to the steps S113 and S114 of FIG. 2.

Figure 20:
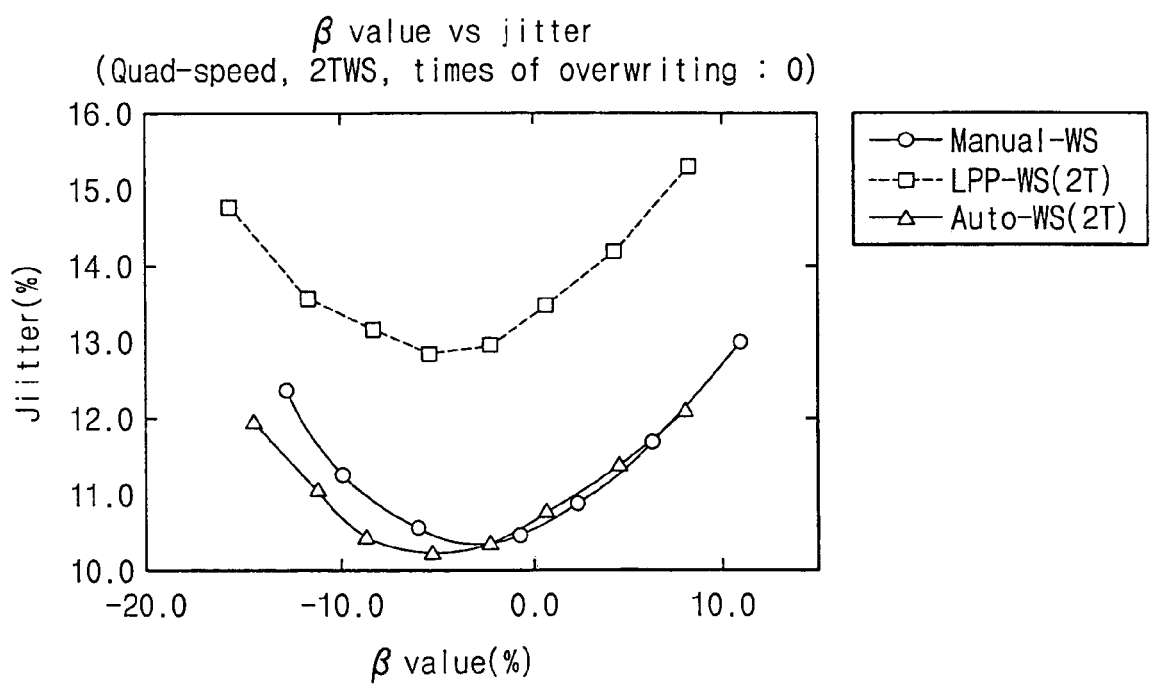
FIG. 20 is a graph showing a reproduction jitter and a β value when data is recorded in a first media using a 2T write strategy.
Figure 21:
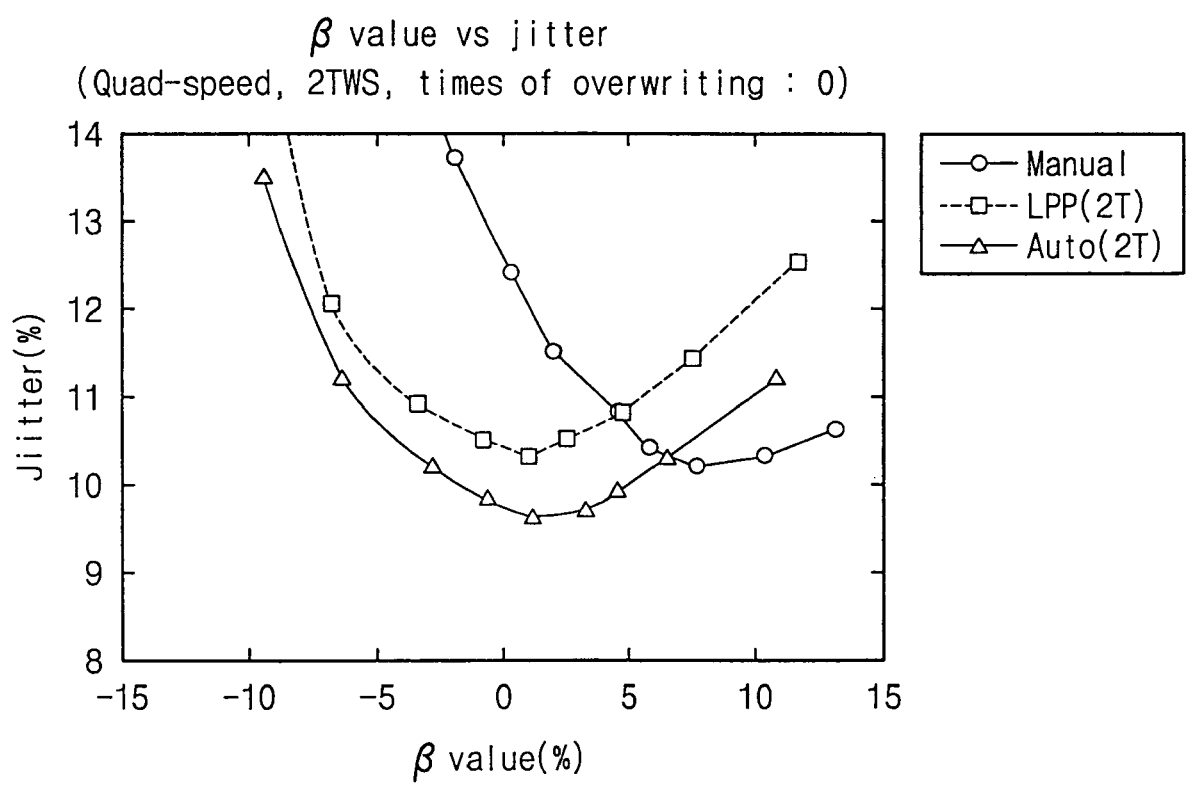
FIG. 21 is a graph showing a reproduction jitter and a β value when data is recorded in a second media using a 2T write strategy.

FIG. 20 shows a reproduction jitter and β value when information is recorded in media A at quad-speed using the 2T strategy, and FIG. 21 shows a reproduction jitter and β value when information is recorded in media B at quad-speed using the 2T strategy. From FIGS. 20 and 21, it can be seen that the write strategy of the present invention has an effect equivalent to or superior to the write strategy set in a manual.

According to the present invention, an optimal write strategy is provided which considers the influence of other marks and lands without using a special recording pattern.

Also, it is possible to easily set the write strategy based on the standards for DVD-RWs, in particular, with respect to the 2T strategy in which the setting condition of the write strategy should be varied in each even track and odd track.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical disc device for recording and reproducing information by forming marks and lands in a rewritable DVD disc, comprising:

recording means for recording information using a reference write strategy and an alternative write strategy in which pulse widths of 3T, 4T and 5-14T marks are individually varied by a set amount with respect to the reference write strategy, when the information is recorded using a 1T strategy;

reproducing means for reproducing the recorded information using each of the reference write strategy and the alternative write strategy;

mark length measuring means for measuring a length of each of the marks from the reproduced information;

memory for storing the measured length of each of the marks, and also storing a theoretical length of each of the marks;

contractile rate computing means for computing inherent contractile rates of the marks from the measured lengths and the theoretical lengths of the marks stored in the memory;

variance computing means for computing a variation rate of the inherent contractile rate of each of the marks from the computed inherent contractile rate when pulse widths of 3T, 4T and 5-14T marks are individually varied by a set amount with respect to the reference write strategy, and obtaining a variance of each of the marks based on equation 1:

$$K = \sum_{i=3}^{14} (dev(iT) - Avg)^2 * R(iT), \qquad (1)$$

where dev(iT) is a deviation of the iT mark; "Avg" is a mean value of the deviations of all the marks; and where R(iT) is a probability of occurrence of mark (iT) and is a known value; and write strategy setting means for setting the write strategy such that the variance when the pulse widths of the 3T, 4T and 5-14T marks are individually varied is minimized.

2. An optical disc device for recording and reproducing information by forming marks and lands in a rewritable DVD disc, comprising:

recording means for recording information using a reference write strategy and an alternative write strategy in which final pulse widths of an even T mark and an odd T mark, an offset of a final pulse, and a pulse width of a 3T mark are individually varied by a set amount with respect to the reference write strategy, when the information is recorded using 2T strategy;

reproducing means for reproducing the recorded information using each of the reference write strategy and the alternative write strategy;

mark length measuring means for measuring lengths of each of the marks of the 3T mark, the even T marks, and the odd T marks except for the 3T mark, from the reproduced information;

memory for storing the measured length of each of the marks and a theoretical length of each of the marks;

variation rate computing means for computing inherent contractile rates of the 3T mark, the even T marks, and the odd T marks except for the 3T mark from the stored length of each of the marks and the stored theoretical length of each of the marks, and a variation rate of each of the marks when the final pulse widths, the offset of the final pulse, and the pulse width of the 3T mark are varied; and write strategy setting means for setting the write strategy from the computed variation rate such that the inherent contractile rate of each of the marks is below a set value.

3. The optical disc device of claim 2, wherein the variation rate computing means computes the inherent contractile rate of each of the marks based on probability of occurrence of each of the marks and a deviation between a length of each of the marks of when the information is recorded using the reference write strategy and a length of each of the marks when the information is recorded using the alternative write strategy in which the final pulse widths of the even T marks and the odd T marks, the offset of the final pulse, and the pulse width of the 3T mark are individually varied by a set amount with respect to the reference write strategy.

4. The optical disc device of claim 3, further comprising:

land length measuring means for measuring lengths of lands before and after the 3T mark when the information is recorded using the write strategy set by the write strategy setting means; and shift amount setting means for setting a shift amount of the 3T mark such that the lengths of the lands before and after the 3T mark become equal to each other.

5. A method for recording and reproducing information by forming marks and lands in an optical information recording medium, the method comprising:

recording information using a reference write strategy and an alternative write strategy in which pulse widths of 3T, 4T and 5-14T marks are individually varied by a set amount with respect to the reference write strategy;

reproducing the recorded information using each of the reference write strategy and the alternative write strategy;

measuring a length of each of the marks from the reproduced information; storing the measured length of each of the marks and a theoretical length of each of the marks;

computing inherent contractile rates of each of the marks from the stored length of each of the marks and the stored theoretical length of each of the marks;

computing a variation rate of the inherent contractile rate of each of the marks when the pulse widths of 3T, 4T and 5-14T marks are individually varied by a set amount with respect to the reference write strategy from the computed inherent contractile rate and obtaining a variance of each of the marks based on equation 2:

$$E(T) = e(4T) * \frac{R(4T)}{R(e)} + e(6T) * \frac{R(6T)}{R(e)} + \qquad (2)$$
$$e(8T) * \frac{R(8T)}{R(e)} + e(10T) * \frac{R(10T)}{R(e)} + e(14T) * \frac{R(14T)}{R(e)}$$

where e(4T), e(6T), . . . , e(mT) represent the computed inherent contractile rates when the even pulses are varied by a minimum resolution, R(iT) represents a probability of occurrence of mark iT, and R(e) is a sum of the probability of occurrence of all even marks; and setting the write strategy such that the variance when the pulse widths of 3T, 4T and 5-14T are individually varied is minimized.

6. A method for recording and reproducing information by forming marks and lands in an optical information recording medium, the method comprising:

recording information using a reference write strategy and an alternative write strategy in which final pulse widths of an even T mark and an odd T mark, an offset of a final pulse, and a pulse width of a 3T mark are individually varied by a set amount with respect to the reference write strategy, when the information is recorded using 2T strategy;

reproducing the recorded information using each of the reference write strategy and the alternative write strategy;

measuring a length of each of the 3T mark, the even T marks, and the odd T marks except for the 3T mark, from the reproduced information;

storing in memory the measured length of each of the marks and a theoretical length of each of the marks;

computing inherent contractile rates of the 3T mark, the even T marks, and the odd T marks except for the 3T mark, from the stored length of each of the marks and the stored theoretical length of each of the marks, and a variation rate of each of the marks when the final pulse widths, the offset of the final pulse and the pulse width of the 3T mark are varied; and setting the write strategy such that the inherent contractile rate of each of the marks approaches a set value from the computed variation rate.

7. The method of claim 6, wherein computing the variation rate of the inherent contractile rate comprises computing the inherent contractile rate of each of the marks based on the probability of occurrence of each of the marks and a deviation between a length of each of the marks of when the information is recorded using the reference write strategy and a length of each of the marks when the information is recorded using the alternative write strategy in which the final pulse widths of the even T mark and the odd T mark, the offset of the final pulse, and the pulse width of the 3T mark are individually varied by a set amount with respect to the reference write strategy.

8. The method of claim 7, further comprising:

measuring lengths of lands before and after the 3T mark when the information is recorded using the set write strategy set; and setting a shift amount of the 3T mark such that the lengths of the lands before and after the 3T mark become equal to each other.

* * * * *